(12) United States Patent
Chiffey et al.

(10) Patent No.: US 11,794,169 B2
(45) Date of Patent: Oct. 24, 2023

(54) OXIDATION CATALYST FOR A COMPRESSION IGNITION ENGINE

(71) Applicant: Johnson Matthey Public Limited Company, London (GB)

(72) Inventors: Andrew Francis Chiffey, Royston (GB); Neil Robert Collins, Royston (GB); John Benjamin Goodwin, Royston (GB); Francois Moreau, Royston (GB); Paul Richard Phillips, Royston (GB)

(*) Notice: Subject to any disclaimer, the term of this patent is extended or adjusted under 35 U.S.C. 154(b) by 0 days.

(21) Appl. No.: 16/798,381

(22) Filed: Feb. 23, 2020

(65) Prior Publication Data

US 2020/0206721 A1 Jul. 2, 2020

Related U.S. Application Data

(63) Continuation of application No. 15/979,689, filed on May 15, 2018, now Pat. No. 10,569,257, which is a (Continued)

(30) Foreign Application Priority Data

May 17, 2013 (GB) .................................. 1308909

(51) Int. Cl.
*B01J 21/04* (2006.01)
*B01J 21/06* (2006.01)
(Continued)

(52) U.S. Cl.
CPC ............ *B01J 23/63* (2013.01); *B01D 53/944* (2013.01); *B01D 53/9468* (2013.01);
(Continued)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS

| 5,063,192 A | 11/1991 | Murakami et al. |
| 5,120,695 A | 6/1992 | Blumrich et al. |

(Continued)

FOREIGN PATENT DOCUMENTS

| CN | 103052444 A | 4/2013 |
| DE | 102012222801 A1 | 6/2013 |

(Continued)

OTHER PUBLICATIONS

"DieselNet: Emmission Test Cycles FTP-75", https://dieselnet.com/standards/cycles/ftp75.php, website DieselNet, Revision: Aug. 2014, copyright 1997-2021, 2 pages.
(Continued)

*Primary Examiner* — Cam N. Nguyen

(57) ABSTRACT

An oxidation catalyst for treating an exhaust gas from a compression ignition engine, which oxidation catalyst comprises: a substrate; a first washcoat region comprising palladium (Pd) and a first support material comprising cerium oxide; and a second washcoat region comprising platinum (Pt) and a second support material.

15 Claims, 3 Drawing Sheets

Related U.S. Application Data continuation of application No. 15/492,211, filed on Apr. 20, 2017, now Pat. No. 9,987,618, which is a continuation of application No. 14/370,175, filed as application No. PCT/GB2014/051499 on May 16, 2014, now Pat. No. 9,643,161.

(51) Int. Cl.

| | | |
|---|---|---|
| *B01J 21/08* | (2006.01) | |
| *B01J 21/12* | (2006.01) | |
| *B01J 23/42* | (2006.01) | |
| *B01J 23/44* | (2006.01) | |
| *B01J 23/58* | (2006.01) | |
| *B01J 23/63* | (2006.01) | |
| *B01J 35/00* | (2006.01) | |
| *B01J 35/04* | (2006.01) | |
| *F01N 3/10* | (2006.01) | |
| *F01N 3/20* | (2006.01) | |
| *F01N 3/28* | (2006.01) | |
| *B01D 53/94* | (2006.01) | |
| *B01J 29/70* | (2006.01) | |
| *B01J 29/74* | (2006.01) | |
| *B01J 37/02* | (2006.01) | |

(52) U.S. Cl.
CPC ..... *B01D 53/9472* (2013.01); *B01D 53/9477* (2013.01); *B01J 23/42* (2013.01); *B01J 23/58* (2013.01); *B01J 29/7007* (2013.01); *B01J 29/7415* (2013.01); *B01J 35/0006* (2013.01); *B01J 35/04* (2013.01); *B01J 37/0244* (2013.01); *B01J 37/0246* (2013.01); *F01N 3/106* (2013.01); *F01N 3/20* (2013.01); *F01N 3/2842* (2013.01); *B01D 2255/1021* (2013.01); *B01D 2255/1023* (2013.01); *B01D 2255/2042* (2013.01); *B01D 2255/2065* (2013.01); *B01D 2255/2092* (2013.01); *B01D 2255/30* (2013.01); *B01D 2255/50* (2013.01); *B01D 2255/502* (2013.01); *B01D 2255/908* (2013.01); *B01D 2255/9022* (2013.01); *B01D 2255/9032* (2013.01); *B01D 2255/91* (2013.01); *B01D 2258/012* (2013.01); *B01J 37/0225* (2013.01); *B01J 37/0234* (2013.01); *F01N 2370/04* (2013.01); *Y02C 20/10* (2013.01)

(58) Field of Classification Search
CPC ... B01J 23/42; B01J 23/44; B01J 23/58; B01J 23/63; B01J 35/0006; B01J 35/04; B01J 29/7007; B01J 29/7415; F01N 3/106; F01N 3/20; F01N 3/2842; B01D 53/944; B01D 53/9468; B01D 53/9472; B01D 53/9477
USPC ............... 502/258–262, 304, 332–334, 339, 502/349–351, 355, 415, 439, 527.12, 502/527.13, 527.19
See application file for complete search history.

(56) References Cited

U.S. PATENT DOCUMENTS

| | | | |
|---|---|---|---|
| 5,473,887 A | 12/1995 | Takeshima et al. | |
| 6,087,298 A | 7/2000 | Sung et al. | |
| 6,239,064 B1 | 5/2001 | Nguyen et al. | |
| 6,248,684 B1 | 6/2001 | Yavuz et al. | |
| 6,375,910 B1 | 4/2002 | Deeba et al. | |
| 7,276,212 B2 | 10/2007 | Hu et al. | |
| 7,329,629 B2 | 2/2008 | Gandhi et al. | |
| 7,374,729 B2 | 5/2008 | Chen et al. | |
| 7,534,738 B2 | 5/2009 | Fujdala et al. | |
| 7,576,031 B2* | 8/2009 | Beutel | B01J 29/7007 502/339 |
| 7,722,829 B2 | 5/2010 | Punke et al. | |
| 7,745,367 B2 | 6/2010 | Fujdala et al. | |
| 7,811,962 B2 | 10/2010 | Hu et al. | |
| 7,837,953 B2 | 11/2010 | Shore | |
| 7,875,573 B2* | 1/2011 | Beutel | B01J 35/0006 502/339 |
| 7,922,987 B2 | 4/2011 | Koegel et al. | |
| 7,947,238 B2 | 5/2011 | Deeba | |
| 7,998,424 B2 | 8/2011 | Bergeal et al. | |
| 8,006,485 B2 | 8/2011 | Twigg et al. | |
| 8,263,033 B2 | 9/2012 | Dobson et al. | |
| 8,540,952 B2 | 9/2013 | Swallow et al. | |
| 8,637,426 B2 | 1/2014 | Hoke et al. | |
| 8,652,429 B2 | 2/2014 | Sumiya et al. | |
| 8,667,785 B2 | 3/2014 | Blakeman et al. | |
| 8,668,877 B2 | 3/2014 | Wei et al. | |
| 8,668,891 B2* | 3/2014 | Blakeman | F01N 3/0828 423/213.5 |
| 8,734,743 B2 | 5/2014 | Muller-Stach et al. | |
| 9,005,559 B2 | 4/2015 | Sumiya et al. | |
| 9,034,269 B2 | 5/2015 | Hilgendorff et al. | |
| 9,034,286 B2 | 5/2015 | Bergeal et al. | |
| 9,046,022 B2 | 6/2015 | Blakeman et al. | |
| 9,259,684 B2 | 2/2016 | Blakeman et al. | |
| 9,333,461 B2 | 5/2016 | Castagnola et al. | |
| 9,333,490 B2 | 5/2016 | Kazi et al. | |
| 9,440,192 B2 | 9/2016 | Hoke et al. | |
| 9,527,034 B2 | 12/2016 | Bergeal et al. | |
| 9,597,661 B2 | 3/2017 | Blakeman et al. | |
| 9,604,174 B2* | 3/2017 | Chiffey | F01N 3/035 |
| 9,610,564 B2 | 4/2017 | Xue et al. | |
| 9,868,115 B2 | 1/2018 | Sumiya et al. | |
| 2004/0166036 A1 | 8/2004 | Chen et al. | |
| 2004/0237515 A1 | 12/2004 | Takaya et al. | |
| 2010/0166629 A1 | 7/2010 | Deeba | |
| 2010/0183490 A1 | 7/2010 | Hoke et al. | |
| 2010/0257843 A1 | 10/2010 | Hoke et al. | |
| 2011/0305612 A1 | 12/2011 | Muller-Stach et al. | |
| 2012/0124975 A1* | 5/2012 | Wei | B01J 19/2485 60/297 |
| 2012/0213674 A1 | 8/2012 | Schuetze et al. | |
| 2013/0084222 A1* | 4/2013 | Grubert | B01J 29/04 502/73 |
| 2015/0033715 A1* | 2/2015 | Markatou | B01J 23/44 502/262 |
| 2015/0125370 A1* | 5/2015 | Klingmann | B01J 35/04 422/169 |
| 2015/0224478 A1 | 8/2015 | Bergeal et al. | |
| 2015/0238934 A1 | 8/2015 | Blakeman et al. | |
| 2016/0167022 A1 | 6/2016 | Chiffey et al. | |
| 2016/0339389 A1 | 11/2016 | Hoke et al. | |
| 2017/0043322 A1 | 2/2017 | Chandler et al. | |
| 2019/0255485 A1* | 8/2019 | Bergeal | B01D 53/945 |

FOREIGN PATENT DOCUMENTS

| | | |
|---|---|---|
| EP | 0766993 A2 | 4/1997 |
| EP | 0782880 A1 | 7/1997 |
| EP | 1068892 A2 | 1/2001 |
| EP | 1815112 A1 | 8/2007 |
| JP | 2012523313 A | 10/2012 |
| RU | 2438777 C2 | 1/2012 |
| WO | 9947260 A1 | 9/1999 |
| WO | 9956859 A1 | 11/1999 |
| WO | 2001094760 A1 | 12/2001 |
| WO | 2007107371 A2 | 9/2007 |
| WO | 2008047170 A1 | 4/2008 |
| WO | 2008132452 A2 | 11/2008 |
| WO | 2010083315 A2 | 7/2010 |
| WO | 2010118125 A2 | 10/2010 |
| WO | 2012071421 A2 | 5/2012 |
| WO | 2012114187 A2 | 8/2012 |
| WO | 2012120292 A1 | 9/2012 |
| WO | 2012156883 A1 | 11/2012 |

(56) References Cited

FOREIGN PATENT DOCUMENTS

| WO | 2012166868 A1 | 12/2012 |
| WO | 2013042080 A1 | 3/2013 |
| WO | 2013088133 A1 | 6/2013 |

OTHER PUBLICATIONS

Burch et al., "Selective reduction of nitrogen oxides by hydrocarbons under lean-burn conditions using supported platinum group metal catalysts", Catalysis Today 26 (1995) pp. 185-206.

* cited by examiner

OXIDATION CATALYST FOR A COMPRESSION IGNITION ENGINE

CROSS-REFERENCE TO RELATED APPLICATIONS

This application is a continuation application of U.S. patent application Ser. No. 15/979,689 filed May 15, 2018, which is a continuation application of U.S. patent application Ser. No. 15/492,211 filed Apr. 20, 2017 (now U.S. Pat. No. 9,987,618), which is a continuation application of U.S. patent application Ser. No. 14/370,175 filed Jul. 1, 2014 (now U.S. Pat. No. 9,643,161), which is the U.S. National Phase application of PCT International Application No. PCT/GB2014/051499, filed on May 16, 2014, and claims priority benefit to Great Britain Patent Application No. 1308909.9 filed on May 17, 2013, the disclosures of each of which are incorporated herein by reference.

FIELD OF THE INVENTION

The invention relates to an oxidation catalyst for a compression ignition engine, particularly a diesel engine, and its uses. The invention also relates to methods involving the oxidation catalyst. The invention further relates to an exhaust system comprising the oxidation catalyst, and to a vehicle comprising the oxidation catalyst or the exhaust system.

BACKGROUND TO THE INVENTION

Compression ignition engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). As emissions standards for permissible emission of pollutants from compression ignition engines, particularly vehicular engines, become progressively tightened, there is a need to provide improved catalysts and exhaust systems that are able to meet these standards and which are cost-effective.

Oxidation catalysts comprising platinum group metals have been used to treat carbon monoxide (CO) and hydrocarbons (HCs), including the volatile organic fraction (VOF) of particulate matter (PM), in exhaust emissions produced by compression ignition engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$). Some platinum group metals, particularly when supported on a refractory oxide, can also promote the oxidation of nitric oxide (NO) to nitrogen dioxide ($NO_2$).

It has been found that platinum (Pt) and palladium (Pd) are each able to oxidise carbon monoxide (CO) and hydrocarbons (HCs) in an exhaust gas from a compression ignition engine. Palladium is generally cheaper than platinum, but is less active toward CO and HCs (e.g. Pd has a higher light-off temperature for CO and HCs than Pt). Palladium is also more susceptible to poisoning by sulfur in fuel compared to platinum. However, platinum-based oxidation catalysts have been found to generate nitrous oxide ($N_2O$) by reduction of $NO_x$ (Catalysis Today 26 (1995) 185-206).

Current legislation for regulating engine emissions does not limit nitrous oxide ($N_2O$) because it is regulated separately as a greenhouse gas (GHG). Nevertheless, it is desirable for emissions to contain minimal nitrous oxide ($N_2O$).

The US Environmental Protection Agency has stated that the impact of 1 pound of nitrous oxide ($N_2O$) in warming the atmosphere is over 300 times that of 1 pound of carbon dioxide ($CO_2$). Nitrous oxide ($N_2O$) is also an ozone-depleting substance (ODS). It has been estimated that nitrous oxide ($N_2O$) molecules stay in the atmosphere for about 120 years before being removed or destroyed.

Typically, an exhaust gas of a compression ignition engine will be treated using an exhaust system where an oxidation catalyst has been combined with at least one other emissions control device. In general, the emissions control device will not remove any nitrous oxide ($N_2O$) generated by the oxidation catalyst, even when the emissions control device receives treated exhaust gas from an outlet of the oxidation catalyst (i.e. the emissions control device is downstream of the oxidation catalyst).

SUMMARY OF THE INVENTION

An object of the invention is to provide an oxidation catalyst for treating an exhaust gas produced by a compression ignition engine, such as a diesel engine, which catalyst has advantageous oxidative activity toward carbon monoxide (CO) and/or hydrocarbons (HCs). In particular, the oxidation catalyst of the invention has excellent CO oxidation activity at low temperatures (i.e. a low light off temperature for CO (e.g. a low $T_{50}$)).

The oxidation catalyst of the invention may additionally or alternatively provide the following advantages: (i) it does not, in use, generate or produce a substantial amount of nitrous oxide ($N_2O$); (ii) it can act as a passive $NO_x$ adsorber (PNA); and/or (iii) it can modulate the $NO_x$ content of an exhaust gas for a downstream emissions control device.

The invention provides an oxidation catalyst for treating an exhaust gas from a compression ignition engine, which oxidation catalyst comprises: a substrate; a first washcoat region comprising palladium (Pd) and a first support material comprising cerium oxide; and a second washcoat region comprising platinum (Pt) and a second support material.

The invention also provides an exhaust system for a compression ignition engine, which exhaust system comprises an oxidation catalyst and an emissions control device, wherein the oxidation catalyst comprises: a substrate; a first washcoat region comprising palladium (Pd) and a first support material comprising cerium oxide; and a second washcoat region comprising platinum (Pt) and a second support material.

Also provided by the invention is a vehicle comprising a compression ignition engine and either an oxidation catalyst of the invention or an exhaust system of the invention.

The invention also provides several uses of the oxidation catalyst and methods involving the oxidation catalyst.

A first method aspect of the invention relates to a method of treating an exhaust gas from a compression ignition engine, which method comprises contacting the exhaust gas with an oxidation catalyst comprising: a substrate; a first washcoat region comprising palladium (Pd) and a first support material comprising cerium oxide; and a second washcoat region comprising platinum (Pt) and a second support material. Generally, the method of treating an exhaust gas from a compression ignition engine is a method of treating (e.g. oxidising) carbon monoxide (CO) and hydrocarbons (HCs) in an exhaust gas from a compression ignition engine, preferably without producing a substantial amount of nitrous oxide ($N_2O$).

A second method aspect of the invention relates to a method of modulating the content of $NO_x$ in an exhaust gas from a compression ignition engine for an emissions control device, which method comprises: (a) controlling the $NO_x$ content of an exhaust gas by contacting the exhaust gas with an oxidation catalyst to produce a treated exhaust gas; and (b) passing the treated exhaust gas to an emissions control device; wherein the oxidation catalyst comprises: a substrate; a first washcoat region comprising palladium (Pd) and a first support material comprising cerium oxide; and a second washcoat region comprising platinum (Pt) and a second support material. Typically, the method is also a method of treating an exhaust gas from a compression ignition engine and modulating the content of $NO_x$ in the exhaust gas for an emissions control device. The method may further relate to a method of treating (e.g. oxidising) carbon monoxide (CO) and hydrocarbons (HCs) in an exhaust gas from a compression ignition engine and modulating the content of $NO_x$ in the exhaust gas for an emissions control device, preferably without producing a substantial amount of nitrous oxide ($N_2O$).

A first use aspect of the invention relates to the use of an oxidation catalyst to treat an exhaust gas from a compression ignition engine, optionally in combination with an emissions control device, wherein the oxidation catalyst comprises: a substrate; a first washcoat region comprising palladium (Pd) and a first support material comprising cerium oxide; and a second washcoat region comprising platinum (Pt) and a second support material. Generally, the oxidation catalyst is used to treat (e.g. oxidise) carbon monoxide (CO) and hydrocarbons (HCs) in an exhaust gas from a compression ignition engine, preferably without producing a substantial amount of nitrous oxide ($N_2O$), optionally in combination with an emissions control device. Thus, the oxidation catalyst can be used to treat (e.g. oxidise) carbon monoxide (CO) and hydrocarbons (HCs) in an exhaust gas from a compression ignition engine and produce a treated exhaust gas comprising substantially no nitrous oxide ($N_2O$). Typically, the treated exhaust gas is then passed onto an emissions control device.

A second use aspect of the invention relates to the use of an oxidation catalyst as a passive $NO_x$ absorber (PNA) in an exhaust gas from a compression ignition engine optionally in combination with an emissions control device, wherein the oxidation catalyst comprises: a substrate; a first washcoat region comprising palladium (Pd) and a first support material comprising cerium oxide; and a second washcoat region comprising platinum (Pt) and a second support material. Generally, the oxidation catalyst is used as a passive $NO_x$ absorber (PNA) and to treat (e.g. oxidise) carbon monoxide (CO) and hydrocarbons (HCs) in an exhaust gas from a compression ignition engine, preferably without producing a substantial amount of nitrous oxide ($N_2O$), optionally in combination with an emissions control device.

In a third use aspect, the invention relates to the use of an oxidation catalyst to modulate the content of $NO_x$ in an exhaust gas from a compression ignition engine for an emissions control device, wherein the oxidation catalyst comprises a substrate, the first washcoat region and a second washcoat region, wherein the first washcoat region comprises palladium (Pd) and a first support material comprising cerium oxide, and wherein the second washcoat region comprises platinum (Pt) and a second support material.

A fourth use aspect relates to the use of an oxidation catalyst in the regeneration of an emissions control device having a filtering substrate, wherein the oxidation catalyst comprises a substrate monolith, the first washcoat region and a second washcoat region, wherein the first washcoat region comprises palladium (Pd) and a first support material comprising cerium oxide, and wherein the second washcoat region comprises platinum (Pt) and a second support material.

In a fifth use aspect, the invention relates to the use of a first washcoat region in an oxidation catalyst (e.g. in an oxidation catalyst comprising the first washcoat region) to reduce or prevent production of $N_2O$ in an exhaust gas from a compression ignition engine, wherein the oxidation catalyst comprises a substrate, the first washcoat region and a second washcoat region, wherein the first washcoat region comprises palladium (Pd) and a first support material comprising cerium oxide, and wherein the second washcoat region comprises platinum (Pt) and a second support material. Typically, the oxidation catalyst is used to reduce or prevent production of $N_2O$ from $NO_x$ (e.g. by the second washcoat region that comprises platinum) in an exhaust gas from a compression ignition engine.

DETAILED DESCRIPTION OF THE INVENTION

Figure 1:
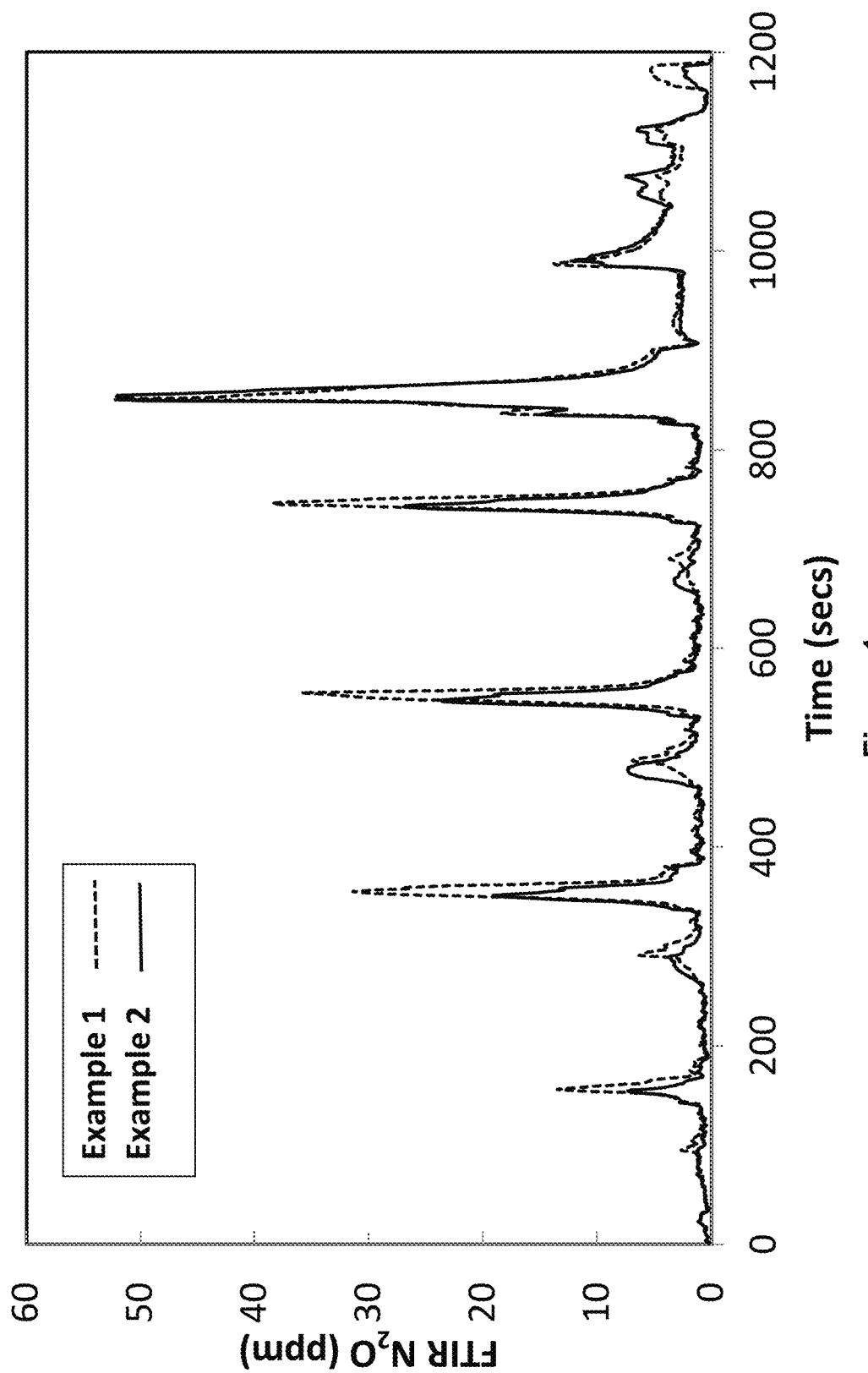
FIG. 1 shows a graph of the amount of $N_2O$ (ppm) in an exhaust gas that has been passed over a catalyst (Example 1=dashed line; Example 2=full line) and which was produced by an engine run over an MVEG cycle.

The oxidation catalyst of the invention has been found to possess excellent CO oxidation activity, especially for compression ignition engines that produce an exhaust gas containing a relatively high concentration of CO. The catalyst of the invention contains both platinum (Pt) and palladium (Pd) because the combination of these platinum group metals provides advantageous oxidative activity. For example, platinum can oxidise nitric oxide (NO) to nitrogen dioxide ($NO_2$) under certain conditions, which may be advantageous for downstream emissions control devices. It has also been found that the inclusion of platinum in a separate washcoat region to a washcoat region comprising both palladium and cerium oxide can reduce or prevent the generation of nitrous oxide ($N_2O$).

The oxidation catalyst of the invention comprises a first washcoat region. The first washcoat region comprises, or consists essentially of, palladium (Pd) and a first support material comprising cerium oxide. The palladium (Pd) is typically disposed or supported on the first support material. For example, the palladium (Pd) can be dispersed on the first support material and/or impregnated into the first support material.

The palladium is generally disposed directly onto or is directly supported by the first support material (e.g. there is no intervening support material between the palladium and the first support material). It is preferred that the palladium is in direct contact with the cerium oxide (i.e. ceria).

Typically, the first support material comprises, or consists essentially of, ceria ($CeO_2$) or ceria-zirconia ($CeO_2$—$ZrO_2$), wherein the ceria or ceria-zirconia is optionally doped. The ceria-zirconia may be a ceria-zirconia solid solution.

The inclusion of a dopant can thermally stabilise the first support material. It is to be understood that any reference to "doped" in this context refers to a material where the bulk or host lattice of the ceria or ceria-zirconia is substitution doped or interstitially doped with a dopant. In some instances, small amounts of the dopant may be present at a surface of the ceria or ceria-zirconia. However, most of the dopant will generally be present in the body of the ceria or ceria-zirconia.

When the first support material comprises ceria-zirconia, then typically the ceria-zirconia comprises at least 45% by weight ceria, preferably at least 50% by weight ceria, more preferably at least 55% by weight ceria, such as at least 70% by weight ceria. The ceria-zirconia may further comprise a total of 1 to 15% by weight, preferably 2 to 12.5% by weight (e.g. 5 to 10% by weight), of an oxide or oxides of a second rare earth metal (e.g. the second rare earth metal is not cerium). The second rare earth metal is typically selected from the group consisting of lanthanum (La), praseodymium (Pr) and combinations thereof.

Generally, the ceria-zirconia consists essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

When the ceria or ceria-zirconia is doped, then the total amount of dopant is 0.1 to 5% by weight (i.e. % by weight of the ceria or the ceria-zirconia). It is preferred that the total amount of dopant is 0.25 to 2.5% by weight, more preferably 0.5 to 1.5% by weight (e.g. about 1% by weight). Ceria may be doped with one or more dopant selected from the group consisting of zirconium (Zr), titanium (Ti), silicon (Si), yttrium (Y), lanthanum (La), praseodymium (Pr), samarium (Sm), neodymium (Nd) and an oxide thereof. Ceria-zirconia may be doped with one or more dopant selected from the group consisting of titanium (Ti), silicon (Si), yttrium (Y), lanthanum (La), praseodymium (Pr), samarium (Sm), neodymium (Nd) and an oxide thereof.

It is preferred that the ceria or the ceria-zirconia has a high surface area. Typically, the ceria or the ceria-zirconia has a surface area of 30 to 300 $m^2$/g, preferably 60 to 200 $m^2$/g. The surface area is measured using conventional nitrogen physisorption techniques.

It is preferred that the first support material comprises, or consists essentially of, ceria ($CeO_2$) or ceria-zirconia ($CeO_2$—$ZrO_2$), which is not doped. The inclusion of a dopant in the first support material may decrease the catalytic activity of the first washcoat region.

It is preferred that the first support material consists essentially of ceria. More preferably, the first support material consists essentially of ceria in a microporous form or a mesoporous form.

Typically, the first washcoat region comprises an amount of the first support material of 0.1 to 4.5 g $in^{-3}$ (e.g. 0.25 to 4.2 g $in^{-3}$), preferably 0.3 to 3.8 g $in^{-3}$, still more preferably 0.5 to 3.0 g $in^{-3}$, and even more preferably 0.6 to 2.5 g $in^{-3}$ (e.g. 0.75 to 2.3 g $in^{-3}$).

Generally, the first washcoat region comprises an amount of palladium (Pd) of 0.2 to 15% by weight (e.g. 11.5 to 14% by weight or 12 to 15% by weight), preferably 0.5 to 10% by weight, more preferably 1 to 9% by weight (e.g. 1.5 to 8% by weight), such as 2 to 7% by weight (e.g. 4 to 6% by weight). The % by weight in this context is with reference to the amount of the first support material.

Typically, the first washcoat region comprises palladium (Pd) in an amount of 5 to 300 g $ft^{-3}$, more preferably 10 to 250 g $ft^{-3}$, such as 20 to 200 g $ft^{-3}$, still more preferably 25 to 175 g $ft^{-3}$, and even more preferably 35 to 150 g $ft^{-3}$ (e.g. 50 to 125 g $ft^{-3}$).

For example, the first washcoat region may comprise palladium (Pd) in an amount of 50 to 300 g $ft^{-3}$, preferably 100 to 275 g $ft^{-3}$, such as 150 to 250 g $ft^{-3}$, more preferably 175 to 200 g $ft^{-3}$. In some instances, a relatively high loading of palladium is beneficial (e.g. for CO oxidation activity).

Typically, the first washcoat region comprises a ratio by weight of palladium (Pd) to cerium (Ce) of 1:1000 to 1:10, preferably 1:500 to 1:15, more preferably 1:250 to 1:25.

It has been found that oxidation catalysts comprising palladium disposed or supported on cerium oxide may possess passive $NO_x$ adsorber (PNA) activity. The terms "passive $NO_x$ absorber" or "passive $NO_x$ adsorber" (PNA) as used herein (and as understood in the art) are used interchangeably and refer to the ability of a catalyst to (a) absorb (i.e. adsorb) $NO_x$ from an exhaust gas (e.g. from a compression ignition engine) at a first temperature range and (b) release $NO_x$ at a second temperature range, wherein the second temperature range is higher than the first temperature range (e.g. the midpoint of the second temperature range is higher than the midpoint of the first temperature range). It is preferable that the second temperature range does not overlap with the first temperature range.

Unlike lean $NO_x$ trap catalysts (sometimes referred to as a $NO_x$ adsorber catalyst (NAC), a De $NO_x$ trap (DNT) catalyst, a $NO_x$ storage catalyst, a lean $NO_x$ trap (LNT) or a $NO_x$ storage/reduction (NSR) catalyst), it is not necessary to alter the proportion of air to reductant (e.g. hydrocarbon, carbon monoxide or hydrogen) in an exhaust gas (e.g. from lean to rich), such as by changing the mode of operation of an engine, to release stored $NO_x$ from a PNA. PNAs can be used to store $NO_x$ when exhaust gas temperatures are relatively cool, such as shortly after start-up of a compression ignition engine. $NO_x$ storage, and generally also $NO_x$ release, occurs at temperatures that are lower than the temperature at which significant oxidation of nitric oxide (NO) to nitrogen dioxide ($NO_2$) by platinum occurs.

Normally, PNA activity would be expected to increase as the number of active sites on the catalyst is increased (e.g. by increasing the amount of palladium or the relative amount of palladium to ceria) until other effects that inhibit contact of $NO_x$ with active sites of the catalyst start to compete or dominate. However, it has unexpectedly been found that excellent PNA activity can be obtained when the amount of palladium supported on cerium oxide is relatively low. In fact, surprisingly limited additional benefit (in relation to PNA activity) is obtained when the loading of palladium on the support material (e.g. ceria) is greater than 2% by weight. This finding is advantageous because both palladium and cerium oxide are expensive materials. PNA activity can be obtained when the oxidation catalyst has a relatively high loading of the first support material (e.g. ceria or ceria-zirconia), particularly in relation to the loading of palladium.

The first washcoat region preferably comprises an amount of the first support material of 0.5 to 3.5 g $in^{-3}$, more preferably 1 to 3.25 g $in^{-3}$, still more preferably 1.1 to 3.0 g $in^{-3}$ (e.g. 1.25 to 2.75 g $in^{-3}$ or 1.5 to 2.75 g $in^{-3}$), and even more preferably 1.25 to 2.5 g $in^{-3}$.

The first washcoat region may comprise an amount of palladium (Pd) of 0.25 to 4% by weight (e.g. 0.4 to 3.5% by weight), preferably 0.5 to 3.0% by weight (e.g. 0.75 to 2.5% by weight or 1 to 1.75% by weight), and even more preferably 0.75 to 1.5% by weight.

It is advantageous if the first washcoat region comprises an amount of palladium less than 2% by weight. It is preferred that the first washcoat region comprises an amount of palladium of 0.25 to 1.9% by weight, more preferably 0.4 to 1.8% by weight, such as 0.5 to 1.75% by weight, and even more preferably 0.75 to 1.5% by weight.

It is preferable that the first washcoat region comprises a ratio by weight of palladium (Pd) to cerium (Ce) of 1:1000 to 1:10, preferably 1:500 to 1:15, more preferably 1:200 to 1:20.

The first washcoat region may comprise palladium (Pd) in an amount of 5 to 120 g ft$^{-3}$, preferably 10 to 100 g ft$^{-3}$, such as 25 to 85 g ft$^{-3}$, still more preferably 35 to 80 g ft$^{-3}$, and even more preferably 50 to 75 g ft$^{-3}$.

The first washcoat region may comprise 95% or less of the total weight of palladium in the oxidation catalyst, preferably 80% or less, more preferably 60% or less.

A low loading of palladium may be advantageous for passive NO$_x$ absorber activity or in applications where the oxidation catalyst is a catalytic soot filter (CSF).

More generally, it is possible to modify the activity of the oxidation catalyst by including other metals, such as catalytically active metals, in the first washcoat region, the second washcoat region or in one or more additional washcoat region(s) (e.g. a third washcoat region or a fourth washcoat region etc.).

For example, the first washcoat region may further comprise a first catalytically active metal selected from the group consisting of platinum (Pt), gold (Au), ruthenium (Ru), rhodium (Rh), iridium (Ir), silver (Ag) and a combination of two or more thereof.

If a first catalytically active metal is present in the first washcoat region, then preferably the first catalytically active metal is platinum (Pt) or gold (Au), more preferably the first catalytically active metal is platinum (Pt). When the metal is gold (Au), then the palladium (Pd) and the gold (Au) may be a palladium-gold alloy. Catalysts comprising gold (Au) can be prepared using the method described in WO 2012/120292 by the present Applicant.

When the first washcoat region comprises a first catalytically active metal, then typically the first washcoat region comprises a total amount of first catalytically active metal of 2 to 150 g ft$^{-3}$, more preferably 5 to 125 g ft$^{-3}$, such as 10 to 110 g ft$^{-3}$, still more preferably 25 to 100 g ft$^{-3}$, and even more preferably 30 to 75 g ft$^{-3}$ (e.g. 40 to 125 g ft$^{-3}$).

When the first washcoat region comprises a first catalytically active metal, it is preferred that the first washcoat region comprises a total molar amount of first catalytically active metal that is less than the molar amount of palladium (Pd). Thus, the first washcoat region comprises a ratio of the total molar amount of palladium (Pd) to the total molar amount of first catalytically active metal of >1:1 (e.g. Pd:M$_1$ of 20:1 to 1.1:1; 10:1 to 1.25:1; 7.5:1 to 2:1; 5:1 to 2.5:1; where M$_1$ represents the first catalytically active metal).

The first washcoat region may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite.

When the first washcoat region comprises a hydrocarbon adsorbent, then typically the total amount of hydrocarbon adsorbent is 0.05 to 3.00 g in$^{-3}$, particularly 0.10 to 2.00 g in$^{-3}$, more particularly 0.2 to 0.8 g in$^{-3}$.

When the hydrocarbon adsorbent is a zeolite, then preferably the zeolite is a medium pore zeolite (e.g. a zeolite having a maximum ring size of eight tetrahedral atoms) or a large pore zeolite (e.g. a zeolite having a maximum ring size of ten tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

In general, it is preferred that the first washcoat region does not comprise a zeolite, more preferably the first washcoat region does not comprise a hydrocarbon adsorbent. Thus, the first washcoat region may be substantially free of hydrocarbon adsorbent or zeolite.

If the oxidation catalyst comprises a hydrocarbon adsorbent, such as a zeolite, then preferably the second washcoat region and/or a third washcoat region comprises the hydrocarbon adsorbent or zeolite.

Typically, the first washcoat region consists essentially of palladium (Pd), the first catalytically active metal, the first support material and optionally a hydrocarbon adsorbent. More preferably, the first washcoat region consists essentially of palladium (Pd), the first catalytically active metal and the first support material.

Generally, the first washcoat region does not comprise a first catalytically active metal as described herein (i.e. palladium is the only active metal for catalysis in the first washcoat region). The first support material may, however, include one or more other materials, but in general such materials are included to stabilise the first support material (e.g. they form part of the bulk composition of the support material) and they are not by themselves catalytically active. Preferably, the first washcoat region is substantially free of or does not comprise platinum. More preferably, the first washcoat region consists essentially of palladium (Pd) and the first support material.

The function of a passive NO$_x$ adsorber (PNA) is different to a lean NO$_x$ trap catalyst. It is therefore unnecessary to include materials in the oxidation catalyst that function as a NO$_x$ adsorber. Such NO$_x$ adsorber materials store NO$_x$ when the exhaust gas is lean and release NO$_x$ when the exhaust gas is rich.

In general, it is preferred that the first washcoat region is substantially free of or does not comprise a NO$_x$ adsorber material for a lean NO$_x$ trap catalyst. NO$_x$ adsorber materials for a lean NO$_x$ trap catalyst typically comprise an alkali metal (e.g. Li, Na, K), an alkaline earth metal (e.g. Mg, Ca, Sr, Ba) and/or a rare earth metal.

The first washcoat region typically is substantially free of or does not comprise an alkali metal (e.g. Li, Na, K), an alkaline earth metal (e.g. Mg, Ca, Sr, Ba) and/or a rare earth metal, particularly a rare earth metal selected from the group consisting of lanthanum (La), yttrium (Y) and a combination thereof. The general exclusion relating to a rare earth metal does not apply to the ceria or ceria-zirconia that is part of the first support material.

Generally, the first washcoat region is substantially free of or does not comprise rhodium (Rh).

It is preferred in general that the first washcoat region does not comprise rhodium (Rh), a hydrocarbon adsorbent, an alkali metal (e.g. Li, Na, K), an alkaline earth metal (e.g. Mg, Ca, Sr, Ba) and a rare earth metal, particularly a rare earth metal selected from the group consisting of lanthanum (La), yttrium (Y) and a combination thereof.

The second washcoat region of the invention comprises platinum (Pt) and a second support material. The second washcoat region and first washcoat region generally have different compositions. It has been found that the generation of $N_2O$ by a washcoat region containing Pt (e.g. the second washcoat region) can be reduced or prevented when it is combined with the first washcoat region.

The second washcoat region typically comprises platinum disposed or supported on the second support material. Platinum may be dispersed on the second support material and/or impregnated into the second support material.

Typically, the second washcoat region comprises an amount of platinum (Pt) of 0.2 to 15% by weight, preferably 0.5 to 10% by weight, more preferably 1 to 9% by weight (e.g. 1.5 to 8% by weight), such as 2 to 7% by weight (e.g. 4 to 6% by weight). The % by weight in this context is with reference to the amount of the second support material.

The second washcoat region typically comprises platinum (Pt) in an amount of 5 to 300 g ft$^{-3}$, more preferably 10 to 250 g ft$^{-3}$, such as 20 to 200 g ft$^{-3}$, still more preferably 25 to 175 g ft$^{-3}$, and even more preferably 35 to 150 g ft$^{-3}$ (e.g. 50 to 125 g ft$^{-3}$).

The second washcoat region may comprise 50% or more of the total weight of platinum in the oxidation catalyst, preferably 70% or more, more preferably 90% or more.

In the second washcoat region, platinum may be the only catalytically active metal. Thus, for example, the second washcoat region does not include a second catalytically active metal as defined below.

However, the activity of the oxidation catalyst may be modified by including other metals, such as a second catalytically active metal, in the second washcoat region. Thus, the second washcoat region may further comprise a second catalytically active metal selected from the group consisting of palladium (Pd), gold (Au), ruthenium (Ru), rhodium (Rh), iridium (Ir), silver (Ag) and a combination of two or more thereof. It is preferred that the second catalytically active metal is palladium (Pd).

The second catalytically active metal may be disposed or supported on the second support material. Thus, the second catalytically active metal can be dispersed on the second support material and/or impregnated into the second support material.

When the second washcoat region comprises a second catalytically active metal, then typically the second washcoat region comprises a total amount of second catalytically active metal of 2 to 150 g ft$^{-3}$, more preferably 5 to 125 g ft$^{-3}$, such as 10 to 110 g ft$^{-3}$, still more preferably 20 to 100 g ft$^{-3}$, and even more preferably 30 to 75 g ft$^{-3}$ (e.g. 40 to 125 g ft$^{-3}$).

When the second washcoat region comprises a second catalytically active metal, then it is preferred that the second washcoat region comprises a total molar amount of second catalytically active metal(s) that is less than the molar amount of platinum (Pt). Thus, second washcoat region comprises a ratio of the molar amount of platinum (Pt) to the total molar amount of second catalytically active metal of >1:1 (e.g. Pt:$M_2$ of 20:1 to 1.1:1; 10:1 to 1.25:1; 7.5:1 to 2:1; 5:1 to 2.5:1; where $M_2$ represents the catalytically active metal).

Generally, it is preferred that the second washcoat region comprises, or consists essentially of, platinum (Pt), palladium (Pd) and a second support material. Typically, the second washcoat region has a ratio by mass of platinum (Pt) to palladium (Pd) of 10:1 to 1:3, more preferably 8.5:1 to 1:2.5, such as 7.5:1 to 1:2 (e.g. 7:1 to 1:1.5), still more preferably 6:1 to 1:1.25 (e.g. 5:1 to 1:1).

In the second washcoat region, the mass of platinum (Pt) is typically greater than the mass of palladium (Pd). Advantageous oxidative activity may be obtained when there is more platinum than palladium in the second washcoat region. Thus, the second washcoat region preferably has a ratio by mass of platinum (Pt) to palladium (Pd) of 10:1 to 1.25:1, more preferably 8:1 to 1.5:1, such as 7:1 to 1.75:1, and still more preferably 6:1 to 2:1.

Typically, the second support material comprises, or consists essentially of, a refractory metal oxide. Refractory metal oxides suitable for use as a catalytic component of an oxidation catalyst for a compression ignition engine are well known in the art.

The refractory metal oxide is preferably selected from the group consisting of alumina, silica, titania, zirconia, ceria and mixed or composite oxides of two or more thereof. More preferably, the refractory metal oxide is selected from alumina, silica and mixed or composite oxides thereof. Even more preferably, the refractory metal oxide is selected from alumina, silica-alumina and a mixture of alumina and ceria.

When the refractory metal oxide is a mixed or composite oxide of alumina, such as silica-alumina or a mixture of alumina and ceria, then preferably the mixed or composite oxide of alumina comprises at least 50 to 99% by weight of alumina, more preferably 70 to 95% by weight of alumina, even more preferably 75 to 90% by weight of alumina.

For the avoidance of doubt, the alumina or a mixed or composite oxide comprising alumina is not a modified alumina incorporating a heteroatom component, particularly a modified alumina incorporating a heteroatom component that comprises, or consists essentially of, an alumina doped with a heteroatom component or an alkaline earth metal aluminate. In this context, the heteroatom component comprises silicon, magnesium, barium, lanthanum, cerium, titanium, or zirconium or a combination of two or more thereof.

It is preferred that the refractory metal oxide is alumina. The alumina can be $\alpha\text{-}Al_2O_3$, $\beta\text{-}Al_2O_3$, or $\gamma\text{-}Al_2O_3$. Preferably the alumina comprises, or consists essentially of, $\gamma\text{-}Al_2O_3$. More preferably, the second washcoat region comprises, or consists essentially of, platinum, palladium and a second support material, wherein the second support material comprises, or consists essentially of, alumina.

Typically, the second washcoat region comprises an amount of the second support material of 0.1 to 3.5 g in$^{-3}$, preferably 0.2 to 2.5 g in$^{-3}$, still more preferably 0.3 to 2.0 g in$^{-3}$, and even more preferably 0.5 to 1.75 g in$^{-3}$ (e.g. 0.75 to 1.5 g in$^{-3}$).

The second washcoat region may further comprise a hydrocarbon adsorbent. The hydrocarbon adsorbent may be selected from a zeolite, active charcoal, porous graphite and a combination of two or more thereof. It is preferred that the hydrocarbon adsorbent is a zeolite, more preferably a zeolite as defined above.

The second washcoat region typically comprises an amount of hydrocarbon adsorbent of 0.05 to 3.00 g in$^{-3}$, particularly 0.10 to 2.00 g in$^{-3}$, more particularly 0.2 to 0.8 g in$^{-3}$.

The second washcoat region may further comprise an oxygen storage material. Such materials are well-known in the art. The second washcoat region may comprise an oxygen storage material in a total amount of 0.1 to 10% (e.g. 0.25 to 2.5%, or 0.5 to 1%) of the total amount of the second support material.

The oxygen storage material may be selected from ceria ($CeO_2$) and ceria-zirconia ($CeO_2$—$ZrO_2$), such as a ceria-zirconia solid solution. When the oxygen storage material is selected from ceria and ceria-zirconia, then preferably the oxygen storage material is either (a) ceria when the first support material comprises, or consists essentially of, ceria-zirconia, or (b) ceria-zirconia when the first support material comprises, or consists essentially of, ceria.

Generally, it is preferable that the second washcoat region consists essentially of platinum, palladium, the second support material and optionally a zeolite.

It is preferred that the second washcoat region, or the oxidation catalyst itself, is substantially free of or does not comprise a $NO_x$ adsorber material for a lean $NO_x$ trap catalyst. $NO_x$ adsorber materials for a lean $NO_x$ trap catalyst typically comprise an alkali metal (e.g. Li, Na, K), an alkaline earth metal (e.g. Mg, Ca, Sr, Ba) and/or a rare earth metal. Cerium and cerium oxide are not considered to be a $NO_x$ adsorber material in this context.

The second washcoat region typically is substantially free of or does not comprise an alkali metal (e.g. Li, Na, K), an alkaline earth metal (e.g. Mg, Ca, Sr, Ba) and/or a rare earth metal, particularly a rare earth metal selected from the group consisting of lanthanum (La), yttrium (Y) and a combination thereof.

Generally, the second washcoat region or the oxidation catalyst of the invention is substantially free of or does not comprise rhodium (Rh).

It is preferred in general that the second washcoat region does not comprise rhodium (Rh), a hydrocarbon adsorbent, an alkali metal (e.g. Li, Na, K), an alkaline earth metal (e.g. Mg, Ca, Sr, Ba) and a rare earth metal, particularly a rare earth metal selected from the group consisting of lanthanum (La), yttrium (Y) and a combination thereof.

In general, the first support material and/or the second support material is in particulate form. Each support material may have a $d_{90}$ particle size of ≤20 μm (as determined by conventional laser diffraction techniques). The particle size distribution of the support material is selected to aid adhesion to the substrate. The particles are generally obtained by milling.

Typically, the oxidation catalyst comprises a total amount (by mass) of platinum and palladium of 1.0 to 10.0 g. The total amount of platinum and palladium that is used depends on, amongst other things, the size of the substrate and the intended application of the oxidation catalyst.

Generally, the total amount of platinum in the first washcoat region and the second washcoat region to the total amount of palladium in the first washcoat region and the second washcoat region have a ratio (by mass) of 20:1 to 1:20. Thus, the ratio by mass of platinum to palladium contained in both the first washcoat region and the second washcoat region can be 20:1 to 1:20. Preferably, the ratio is 10:1 to 1:10 (e.g. 8:1 to 1:8), more preferably the ratio is 7.5:1 to 1:7.5, such as 5:1 to 1:5, still more preferably the ratio is 4:1 to 1:4 (e.g. 3:1 to 1:3), such as 2.5:1 to 1:2.5 (e.g. 2:1 to 1:2).

Typically, the oxidation catalyst comprises a total amount of platinum (Pt) and a total amount of palladium (Pd) in a ratio (by mass) of ≥1:3.5. It is preferred that the ratio (by mass) is ≥1:2.5, more preferably ≥1:2, particularly ≥1:1.5, such as ≥1:1.

Oxidation catalysts of the invention where the total amount (by mass) of palladium (Pd) is less than the total amount (by mass) of platinum (Pt), typically where each total amount refers to the combined amount of palladium or platinum in the first and second washcoat regions or in the oxidation catalyst as a whole, may have advantageous activity.

The ratio (by mass) of platinum (Pt) to palladium (Pd) is typically 20:1 to 1.1:1 (e.g. 15:1 to 1.2:1), preferably the ratio is 10:1 to 1.3:1 (e.g. 9:1 to 1.4:1), more preferably 8:1 to 1.5:1, even more preferably 7.5:1 to 1.75:1, such as 6:1 to 2:1, and still more preferably 5.5:1 to 2.5:1 (e.g. 5:1 to 3:1).

The oxidation catalyst of the invention generally comprises a total amount of first support material and second support material of 0.2 to 8 g in$^{-3}$, preferably 0.4 to 7 g in$^{-3}$ (e.g. 0.5 to 6 g in$^{-3}$), more preferably 0.75 to 5 g in$^{-3}$ (e.g. 0.8 to 4 g in$^{-3}$), still more preferably 1.0 to 3 g in$^{-3}$.

The first washcoat region and the second washcoat region are disposed or supported on the same substrate. Methods of making washcoat regions of different arrangements are known in the art (see for example WO 99/47260 by the present Applicant). However, it is to be understood that certain arrangements of the first washcoat region and the second washcoat region on the substrate may be particularly advantageous for oxidising CO, for reducing or avoiding the generation of nitrous oxide ($N_2O$) or for passive $NO_x$ absorber activity.

Generally, the first washcoat region may be disposed directly on to the substrate (i.e. the first washcoat region is in contact with a surface of the substrate). The second washcoat region may be (a) disposed or supported on the first washcoat region, (b) disposed directly on to the substrate (i.e. the second washcoat region is in contact with a surface of the substrate), and/or (c) in contact with the first washcoat region. Alternatively, the second washcoat region may be disposed directly on to an additional washcoat region (e.g. a third washcoat region).

When the second washcoat region is disposed or supported on the first washcoat region, the second washcoat region may be disposed directly on to the first washcoat region (i.e. the second washcoat region is in contact with a surface of the first washcoat region) or the second washcoat region may be disposed directly on to an additional washcoat region (e.g. a third washcoat region), where the additional washcoat region is disposed (e.g. directly or otherwise) or supported on the first washcoat region. When the second washcoat region is disposed directly on to the substrate, then the second washcoat region may be in contact with the first washcoat region or the first washcoat region and the second washcoat region may be separated (e.g. by an intervening third washcoat region or by a gap).

Typically, the second washcoat region is disposed directly on to the substrate (i.e. the second washcoat region is in contact with a surface of the substrate). The first washcoat region may be (i) disposed or supported on the second washcoat region, (ii) disposed directly on to the substrate (i.e. the first washcoat region is in contact with a surface of the substrate), and/or (iii) in contact with the second washcoat region. Alternatively, the first washcoat region may be disposed directly on to an additional washcoat region (e.g. a third washcoat region).

When the first washcoat region is disposed or supported on the second washcoat region, the first washcoat region may be disposed directly on to the second washcoat region (i.e. the first washcoat region is in contact with a surface of the second washcoat region) or the first washcoat region may be disposed directly on to an additional washcoat region (e.g. a third washcoat region), where the additional washcoat region is disposed (e.g. directly or otherwise) or supported on the second washcoat region. When the first washcoat region is disposed directly on to the substrate, then the first washcoat region may be in contact with the second washcoat region or the second washcoat region and the first washcoat region may be separated (e.g. by an intervening third washcoat region or by a gap).

In general, it is possible that both the first washcoat region and the second washcoat are not directly disposed on the substrate (i.e. neither the first washcoat region nor the second washcoat region is in contact with a surface of the substrate). Thus, at least one of the first washcoat region and the second washcoat region is disposed or supported on an additional washcoat region (e.g. a third washcoat region). Both the first washcoat region and the second washcoat region can be disposed or supported on the same additional washcoat region (e.g. a third washcoat region).

Some oxidation catalysts of the invention are described below where the first washcoat region and the second washcoat region have "zoned" arrangements. For the avoidance of doubt, these arrangements are general features of the oxidation catalyst of the invention and may be combined with the arrangements of the first and second washcoat regions described above.

In a first oxidation catalyst arrangement, the first washcoat region is a first washcoat zone disposed or supported at or near an inlet end of the substrate. The second washcoat region may be disposed or supported upstream or downstream of the first washcoat zone, preferably downstream. Preferably, the second washcoat region is a second washcoat zone. More preferably, the second washcoat zone is disposed or supported downstream of the first washcoat zone.

In a second oxidation catalyst arrangement, the first washcoat region is a first washcoat zone disposed or supported at an outlet end of the substrate. The second washcoat region may be disposed or supported upstream or downstream of the first washcoat zone, preferably upstream. Preferably, the second washcoat region is a second washcoat zone. More preferably, the second washcoat zone is disposed or supported upstream of the first washcoat zone.

In a third oxidation catalyst arrangement, the second washcoat region is a second washcoat zone disposed or supported at an inlet end of the substrate. The first washcoat region may be disposed or supported upstream or downstream of the second washcoat zone, preferably downstream. Preferably, the first washcoat region is a first washcoat zone. More preferably, the first washcoat zone is disposed or supported downstream of the second washcoat zone.

In a fourth oxidation catalyst arrangement, the second washcoat region is a second washcoat zone disposed or supported at an outlet end of the substrate. The first washcoat region may be disposed or supported upstream or downstream of the second washcoat zone, preferably upstream. Preferably, the first washcoat region is a first washcoat zone. More preferably, the first washcoat zone is disposed or supported upstream of the second washcoat zone.

The first washcoat zone may adjoin the second washcoat zone. More preferably, the first washcoat zone is contact with the second washcoat zone. When the first washcoat zone adjoins the second washcoat zone or the first washcoat zone is in contact with the second washcoat zone, the first washcoat zone and the second washcoat zone may be disposed or supported on the substrate as a layer, such as a single layer (e.g. a single layer). Thus, a layer may be formed on the substrate when the first and second washcoat zones adjoin or are in contact with one another.

The first washcoat zone may be separate from the second washcoat zone. Thus, there may be an intervening additional washcoat zone or region (e.g. a third washcoat zone or region) between the first washcoat zone and the second washcoat zone, and/or there may be a gap (e.g. a space) between the first washcoat zone and the second washcoat zone.

The first washcoat zone may overlap the second washcoat zone. Thus, an end portion of the first washcoat zone may be disposed or supported on the second washcoat zone. The first washcoat zone may completely or partly overlap the second washcoat zone. When the first washcoat zone completely overlaps the second washcoat zone, then typically a surface of the second washcoat zone (normally a surface in the longitudinal plane of the catalyst, i.e. the plane that is perpendicular to the plane of the inlet and outlet ends of the substrate) is completely covered by the first washcoat zone.

Alternatively, the second washcoat zone may overlap the first washcoat zone. Thus, an end portion of the second washcoat zone may be disposed or supported on the first washcoat zone. The second washcoat zone may completely or partly overlap the first washcoat zone. When the second washcoat zone completely overlaps the first washcoat zone, then typically a surface of the first washcoat zone (normally a surface in the longitudinal plane of the catalyst, i.e. the plane that is perpendicular to the plane of the inlet and outlet ends of the substrate) is completely covered by the second washcoat zone.

Typically, the first washcoat zone has a length of 10 to 90% of the length of the substrate (e.g. 10 to 45%), preferably 15 to 75% of the length of the substrate (e.g. 15 to 40%), more preferably 20 to 65% (e.g. 25 to 45%) of the length of the substrate, still more preferably 25 to 50%.

The second washcoat zone typically has a length of 10 to 90% of the length of the substrate (e.g. 10 to 45%), preferably 15 to 75% of the length of the substrate (e.g. 15 to 40%), more preferably 20 to 65% (e.g. 25 to 45%) of the length of the substrate, still more preferably 25 to 50%.

Oxidation catalysts of the invention are described below where the first washcoat region and the second washcoat region have "layered" arrangements. For the avoidance of doubt, these arrangements are general features of the oxidation catalyst of the invention and may be combined with any of the arrangements of the first and second washcoat regions described above.

The first washcoat region may be a first washcoat layer and the second washcoat region may be a second washcoat layer. The first washcoat layer and the second washcoat layer may have different lengths, or the first washcoat layer and the second washcoat layer may have about the same length. Generally, the length of the first washcoat layer and the length of the second washcoat layer is each substantially uniform.

Typically, at least one of the first washcoat layer and the second washcoat layer extends for substantially an entire length of the substrate, particularly the entire length of the channels of a substrate monolith. More preferably, the first washcoat layer and the second washcoat layer each extend for substantially an entire length of the substrate.

In a fifth oxidation catalyst arrangement, the first washcoat layer is disposed or supported on the second washcoat layer. The first washcoat layer may be disposed directly on to the second washcoat layer (i.e. the first washcoat layer is in contact with a surface of the second washcoat layer) or the first washcoat layer may be disposed directly on to an additional washcoat region or layer (e.g. a third washcoat region or layer), which additional washcoat region or layer is disposed or supported on the second washcoat layer. Preferably, the entire length of the first washcoat layer is disposed or supported on the second washcoat layer. Thus, the length of the first washcoat layer is less than or equal to the length of the second washcoat layer. More preferably, an end of the first washcoat layer does not extend beyond an end of the second washcoat layer (i.e. the ends or boundaries of the first washcoat layer are within the ends or boundaries of the second washcoat layer).

In the fifth oxidation catalyst arrangement, the first washcoat layer may be disposed or supported on an additional washcoat region (e.g. a third or fourth washcoat region), particularly an additional washcoat layer or zone. The additional washcoat region may be disposed directly on to the substrate.

It is preferred in the fifth oxidation catalyst arrangement that the second washcoat layer is disposed directly on to the substrate (i.e. the second washcoat layer is in contact with a surface of the substrate).

In the fifth oxidation catalyst arrangement, an additional washcoat region (e.g. a third, fourth or fifth washcoat region), particularly an additional washcoat layer or zone, may be disposed directly on to the second washcoat layer (i.e. the additional washcoat region is in contact with a surface of the second washcoat layer).

In a sixth oxidation catalyst arrangement, the second washcoat layer is disposed or supported on the first washcoat layer. The second washcoat layer may be disposed directly on to the first washcoat layer (i.e. the second washcoat layer is in contact with a surface of the first washcoat layer) or the second washcoat layer may be disposed directly on to an additional washcoat region or layer (e.g. a third washcoat region or layer), which additional washcoat region or layer is disposed or supported on the first washcoat layer. Preferably, the entire length of the second washcoat layer is disposed or supported on the first washcoat layer. Thus, the length of the second washcoat layer is less than or equal to the length of the first washcoat layer. More preferably, an end of the second washcoat layer does not extend beyond an end of the first washcoat layer (i.e. the ends or boundaries of the second washcoat layer are within the ends or boundaries of the first washcoat layer).

In the sixth oxidation catalyst arrangement, the second washcoat layer may be disposed or supported on an additional washcoat region (e.g. a third or fourth washcoat region), particularly an additional washcoat layer or zone. The additional washcoat region may be disposed directly on to the substrate.

It is preferred in the sixth oxidation catalyst arrangement that the first washcoat layer is disposed directly on to the substrate (i.e. the first washcoat layer is in contact with a surface of the substrate).

In the sixth oxidation catalyst arrangement, an additional washcoat region (e.g. a third, fourth or fifth washcoat region), particularly an additional washcoat layer or zone, may be disposed directly on to the first washcoat layer (i.e. the additional washcoat region is in contact with a surface of the first washcoat layer).

The oxidation catalyst of the invention may comprise a plurality of washcoat regions, in addition to the first washcoat region and the second washcoat region.

Generally, it is preferred that the oxidation catalyst comprises only three or four washcoat regions (including the first washcoat region and the second washcoat region). Thus, the oxidation catalyst may further comprise a third washcoat region (e.g. a third washcoat layer or zone) and a fourth washcoat region (e.g. a fourth washcoat layer or zone. More preferably, the oxidation catalyst comprises only three washcoat regions (including the first washcoat region and the second washcoat region). Thus, the oxidation catalyst further comprises a third washcoat region. Even more preferably, the oxidation catalyst comprises only two washcoat regions, which washcoat regions are the first washcoat region and the second washcoat region.

Certain oxidation catalyst arrangements are particularly advantageous for reducing the amount of nitrous oxide ($N_2O$) that is generated. Oxidation catalyst arrangements where most or all of the exhaust gas comes into contact with the first washcoat region before the second washcoat region have been found to generate less $N_2O$.

It is preferred that the first washcoat region is arranged to contact inlet exhaust gas before the second washcoat region, such as in any one of the first to fifth oxidation catalyst arrangements, and wherein in the first to fourth oxidation catalyst arrangements the second washcoat region is disposed or supported downstream of the first washcoat region. More preferably, the oxidation catalyst has the first oxidation catalyst arrangement or the fifth oxidation catalyst arrangement, wherein in the first oxidation catalyst arrangement the second washcoat region is disposed or supported downstream of the first washcoat region.

Advantageous oxidation activity and/or the amount of nitrous oxide ($N_2O$) produced by the oxidation catalyst can be reduced or prevented when the oxidation catalyst comprises a substrate, and:
(a) a first washcoat zone comprising palladium (Pd) and a first support material comprising cerium oxide; and a second washcoat zone comprising platinum (Pt) and a second support material; wherein the second washcoat zone is disposed or supported on the substrate downstream of the first washcoat zone; or
(b) a first washcoat layer comprising palladium (Pd) and a first support material comprising cerium oxide; and a second washcoat layer comprising platinum (Pt) and a second support material; wherein the first washcoat layer is disposed or supported on the second washcoat layer.

Generally, the oxidation catalyst further comprises an additional washcoat region (e.g. a third washcoat region), wherein the additional washcoat region is arranged to contact inlet exhaust gas before the first washcoat region and the second washcoat region, and wherein the additional washcoat region comprises a hydrocarbon adsorbent. Thus, the additional washcoat region may be downstream of both the first washcoat region and the second washcoat region and/or the additional washcoat region may be disposed or supported on both the first washcoat region and the second washcoat region (e.g. the additional washcoat region may be the uppermost layer). The hydrocarbon adsorbent may be present in the additional washcoat region in an amount as defined above for the first washcoat region or the second washcoat region. Preferably, the hydrocarbon adsorbent is a zeolite, such as a zeolite as defined above.

Substrates for supporting oxidation catalysts for treating the exhaust gas of a compression ignition engine are well known in the art. The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) and/or a passive $NO_x$ absorber (PNA) or is for use as a diesel oxidation catalyst (DOC) and/or as a passive $NO_x$ absorber (PNA).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the oxidation catalyst of the invention is for use as (i) a passive $NO_x$ absorber (PNA) and/or (ii) a diesel oxidation catalyst (DOC) or a catalysed soot filter (CSF). In practice, catalyst formulations employed in DOCs and CSFs are similar. Generally, however, a principle difference between a DOC and a CSF is the substrate onto which the catalyst formulation is coated and the total amount of platinum, palladium and any other catalytically active metals that are coated onto the substrate.

The invention also provides an exhaust system comprising the oxidation catalyst and an emissions control device. In general, the emissions control device is separate to the oxidation catalyst (e.g. the emissions control device has a separate substrate to the substrate of the oxidation catalyst), and preferably the oxidation catalyst is upstream of the emissions control device.

The exhaust system of the invention may further comprise a fuel sulphur-removal device. A fuel sulphur-removal device can be upstream or downstream of the oxidation catalyst. Preferably the fuel sulphur-removal device is upstream of the oxidation catalyst. Fuel sulphur-removal devices are known in the art. The oxidation catalyst of the invention may be susceptible to deactivation by sulphur. Deactivation of the oxidation catalyst by fuel sulphur can be reduced or prevented when a fuel sulphur-removal device is upstream of the oxidation catalyst. Oxidation catalysts containing platinum often oxidise fuel sulphur to $SO_2$ or may increase sulphate particulate emissions, particularly at higher exhaust temperatures.

The emissions control device may be selected from a diesel particulate filter (DPF), a $NO_x$ adsorber catalyst (NAC), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, and combinations of two or more thereof. Emissions control devices represented by the terms diesel particulate filters (DPFs), $NO_x$ adsorber catalysts (NACs), lean $NO_x$ catalysts (LNCs), selective catalytic reduction (SCR) catalysts, diesel oxidation catalyst (DOCs), catalysed soot filters (CSFs) and selective catalytic reduction filter (SCRF™) catalysts are all well known in the art.

Examples of emissions control devices for use with the oxidation catalyst of the invention or for inclusion in the exhaust system of the invention are provided below.

A diesel particulate filter is an emissions control device having a filtering substrate. The diesel particulate filter preferably comprises a substrate, wherein the substrate is a filtering monolith or a flow-through monolith as defined above, preferably a filtering monolith. The substrate may be coated with a catalyst formulation.

The catalyst formulation of the diesel particulate filter may be suitable for oxidising (i) particulate matter (PM) and/or (ii) carbon monoxide (CO) and hydrocarbons (HCs).

When the catalyst formulation is suitable for oxidising PM, then the resulting emissions control device is known as a catalysed soot filter (CSF). A catalysed soot filter (CSF) is also an emissions control device having a filtering substrate. Typically, the catalyst formulation of a CSF comprises a noble metal as defined above and/or platinum and/or palladium.

The catalyst formulation of the diesel particulate filter may be a $NO_x$ adsorber composition. When the catalyst formulation is a $NO_x$ adsorber composition, the emissions control device is an example of a $NO_x$ adsorber catalyst (NAC) (e.g. a $NO_x$ adsorber composition on a filter). Emissions control devices where the catalyst formulation is a $NO_x$ adsorber composition have been described (see, for example, EP 0766993). $NO_x$ adsorber compositions are well known in the art (see, for example, EP 0766993 and U.S. Pat. No. 5,473,887). $NO_x$ adsorber compositions are designed to adsorb $NO_x$ from lean exhaust gas (lambda >1) and to desorb the $NO_x$ when the oxygen concentration in the exhaust gas is decreased. Desorbed $NO_x$ may then be reduced to $N_2$ with a suitable reductant (e.g. engine fuel) and promoted by a catalyst component, such as rhodium, of the $NO_x$ adsorber composition itself or located downstream of the $NO_x$ adsorber composition.

In general, $NO_x$ adsorber catalysts comprise coated on honeycomb flow-through monolith substrates are typically arranged in layered arrangements. However, multiple layers applied on a filter substrate can create backpressure problems. It is highly preferable, therefore, if the $NO_x$ absorber catalyst for use in the present invention is a "single layer" $NO_x$ absorber catalyst. Particularly preferred "single layer" $NO_x$ absorber catalysts comprise a first component of rhodium supported on a ceria-zirconia mixed oxide or an optionally stabilised alumina (e.g. stabilised with silica or lanthana or another rare earth element) in combination with second components which support platinum and/or palladium. The second components comprise platinum and/or palladium supported on an alumina-based high surface area support and a particulate "bulk" ceria ($CeO_2$) component, i.e. not a soluble ceria supported on a particulate support, but "bulk" ceria capable of supporting the Pt and/or Pd as such. The particulate ceria comprises a $NO_x$ absorber component and supports an alkaline earth metal and/or an alkali metal, preferably barium, in addition to the platinum and/or palladium. The alumina-based high surface area support can be magnesium aluminate e.g. $MgAl_2O_4$, for example.

The preferred "single layer" NAC composition comprises a mixture of the rhodium and platinum and/or palladium support components. These components can be prepared separately, i.e. pre-formed prior to combining them in a mixture, or rhodium, platinum and palladium salts and the supports and other components can be combined and the rhodium, platinum and palladium components hydrolysed preferentially to deposit onto the desired support.

Generally, a $NO_x$ adsorber composition comprises an alkali metal component, an alkaline earth metal component or a rare earth metal component or a combination of two or more components thereof, wherein the rare earth metal component comprises lanthanum or yttrium. It is preferred that the alkali metal component comprises potassium or sodium, more preferably potassium. It is preferred that the alkaline earth metal component comprises barium or strontium, more preferably barium.

The $NO_x$ adsorber composition may further comprise a support material and/or a catalytic metal component. The support material may be selected from alumina, ceria, titania, zirconia and mixtures thereof. The catalytic metal component may comprise a metal selected from platinum (Pt), palladium (Pd), rhodium (Rh) and combinations of two or more thereof.

Lean $NO_x$ catalysts (LNCs) are well known in the art. Preferred lean $NO_x$ catalysts (LNC) comprises either (a) platinum (Pt) supported on alumina or (b) a copper exchanged zeolite, particularly copper exchanged ZSM-5.

SCR catalysts are also well known in the art. When the exhaust system of the invention comprises an SCR catalyst, then the exhaust system may further comprise an injector for injecting a nitrogenous reductant, such as ammonia, or an ammonia precursor, such as urea or ammonium formate, preferably urea, into exhaust gas downstream of the catalyst for oxidising carbon monoxide (CO) and hydrocarbons (HCs) and upstream of the SCR catalyst. Such injector is fluidly linked to a source of such nitrogenous reductant precursor, e.g. a tank thereof, and valve-controlled dosing of the precursor into the exhaust stream is regulated by suitably programmed engine management means and closed loop or open loop feedback provided by sensors monitoring relevant exhaust gas composition. Ammonia can also be generated by heating ammonium carbamate (a solid) and the ammonia generated can be injected into the exhaust gas.

Alternatively or in addition to the injector, ammonia can be generated in situ e.g. during rich regeneration of a NAC disposed upstream of the filter or by contacting a DOC disposed upstream of the filter with engine-derived rich exhaust gas. Thus, the exhaust system may further comprise an engine management means for enriching the exhaust gas with hydrocarbons. The SCR catalyst can then use the hydrocarbons as a reductant to reduce $NO_x$.

SCR catalysts for use in the present invention promote the reactions selectively $4NH_3+4NO+O_2 \rightarrow 4N_2+6H_2O$ (i.e. 1:1 $NH_3$:NO); $4NH_3+2NO+2NO_2 \rightarrow 4N_2+6H_2O$ (i.e. 1:1 $NH_3$:$NO_x$; and $8NH_3+6NO_2 \rightarrow 7N_2+12H_2O$ (i.e. 4:3 $NH_3$:$NO_x$) in preference to undesirable, non-selective side-reactions such as $2NH_3+2NO_2 \rightarrow N_2O+3H_2O+N_2$.

The SCR catalyst may comprise a metal selected from the group consisting of at least one of Cu, Hf, La, Au, In, V, lanthanides and Group VIII transition metals, such as Fe, which metal is supported on a refractory oxide or molecular sieve. Particularly preferred metals are Ce, Fe and Cu and combinations of any two or more thereof.

The refractory oxide may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$, $WO_x/CeZrO_2$, $WO_x/ZrO_2$ or $Fe/WO_x/ZrO_2$.

It is particularly preferred when an SCR catalyst or washcoat thereof comprises at least one molecular sieve, such as an aluminosilicate zeolite or a SAPO. The at least one molecular sieve can be a small, a medium or a large pore molecular sieve, for example.

By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts—see for example WO 2008/132452.

Preferred molecular sieves with application as SCR catalysts in the present invention are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

At its most basic, an ammonia slip catalyst (ASC) can be an oxidation catalyst for oxidising ammonia which slips past an upstream SCR or SCRF catalyst unreacted. The desired reaction (simplified) can be represented by $4NO+4NH_3+O_2 \rightarrow 4N_2+6H_2O$. Ammonia is a strong smelling compound and potential irritant to animal mucosal surfaces, e.g. eyes and respiratory pathways, and so its emission to atmosphere should be limited so far as possible. Possible ammonia slip catalysts include relatively low loaded platinum group metals, preferably including Pt e.g. 1-15 $g/ft^3$, on a suitable relatively high surface area oxide support, e.g. alumina coated on a suitable substrate monolith.

In a particularly preferred arrangement, however, the platinum group metal and the support material (e.g. comprising a modified alumina incorporating a heteroatom component) is disposed on a substrate (i.e. a substrate monolith) in a first layer below an upper, second layer overlying the first layer. The second layer is a SCR catalyst, selected from any of those mentioned hereinabove, particularly molecular sieves containing transition metals, such as Cu or Fe. A particularly preferred ASC in the layered arrangement comprises CuCHA in the second or upper layer.

When the substrate of the SCR catalyst is a filtering monolith, then the catalyst is an SCRF™ catalyst. An SCRF™ catalyst is an emissions control device having a filtering substrate.

Generally, SCR catalysts are unable to reduce substantial amounts of $NO_x$ in an exhaust gas shortly after start-up of a compression ignition engine because the exhaust gas temperature (and hence the temperature of the catalyst) is too low. Lean $NO_x$ trap catalysts have, for example, been employed upstream of SCR catalysts, so that $NO_x$ can be stored until the SCR catalyst becomes active at higher exhaust gas temperatures.

However, lean $NO_x$ trap catalysts are often unable to adequately store $NO_x$ when there is a large mass flow of exhaust gas (e.g. when the engine is operated at a high speed cycle).

The $NO_x$ content of an exhaust gas directly from a compression ignition engine depends on a number of factors, such as the mode of operation of the engine, the temperature of the engine and the speed at which the engine is run. However, it is common for an engine to produce an exhaust gas where $NO_x$ content is 85 to 95% (by volume) nitric oxide (NO) and 5 to 15% (by volume) nitrogen dioxide ($NO_2$). The $NO:NO_2$ ratio is typically from 19:1 to 17:3. However, it is generally favourable for the $NO_2$ content to be much higher for selective catalytic reduction (SCR) catalysts to reduce $NO_x$ or to regenerate an emissions control device having a filtering substrate by burning off particulate matter. The PNA activity of the oxidation catalyst can be used to modulate the $NO_x$ content of an exhaust gas from a compression ignition engine.

The PNA activity of the oxidation catalyst of the present invention allows $NO_x$, particularly $NO_x$ to be stored at low exhaust temperatures. At higher exhaust gas temperatures, the oxidation catalyst is able to oxidise NO to $NO_2$. It is therefore advantageous to combine the oxidation catalyst of the invention with certain types of emissions control devices as part of an exhaust system.

In a first exhaust system embodiment, the exhaust system comprises the oxidation catalyst of the invention, preferably as a PNA and/or a DOC, and a selective catalytic reduction (SCR) catalyst. This embodiment also relates to the use of the oxidation catalyst for treating an exhaust gas from a compression ignition engine in combination with a selective catalytic reduction filter (SCRF™) catalyst, preferably wherein the oxidation catalyst is, or is for use as, a diesel oxidation catalyst. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

A second exhaust system embodiment comprises the oxidation catalyst of the invention, preferably as a PNA and/or a DOC, and a selective catalytic reduction filter (SCRF™) catalyst. This embodiment also relates to the use of the oxidation catalyst for treating an exhaust gas from a compression ignition engine in combination with a selective catalytic reduction filter (SCRF™) catalyst, preferably wherein the oxidation catalyst is, or is for use as, a diesel oxidation catalyst. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In a third exhaust system embodiment, the exhaust system comprises the oxidation catalyst of the invention, preferably as a PNA and/or a DOC, and either a diesel particulate filter (DPF) or a catalysed soot filter (CSF). This embodiment also relates to the use of the oxidation catalyst for treating an exhaust gas from a compression ignition engine in combination with a diesel particulate filter or a catalysed soot filter, preferably wherein the oxidation catalyst is, or is for use as, a diesel oxidation catalyst. The oxidation catalyst is typically followed by (e.g. is upstream of) the diesel particulate filter or the catalysed soot filter (CSF). Thus, for example, an outlet of the oxidation catalyst is connected to an inlet of the diesel particulate filter or the catalysed soot filter.

In a fourth exhaust system embodiment, the exhaust system comprises a diesel oxidation catalyst and the oxidation catalyst of the invention, preferably as a catalysed soot filter (CSF). The embodiment further relates to the use of the oxidation catalyst for treating an exhaust gas from a compression ignition engine in combination with a diesel oxidation catalyst (DOC), preferably wherein the oxidation catalyst is, or is for use as, a catalysed soot filter. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A fifth exhaust system embodiment relates to an exhaust system comprising the oxidation catalyst of the invention, preferably as a PNA and/or a DOC, a diesel particulate filter or a catalysed soot filter (CSF), and a selective catalytic reduction (SCR) catalyst. The DOC/DPF/SCR or DOC/CSF/SCR arrangement is a preferred exhaust system for a light-duty diesel vehicle. This embodiment also relates to the use of the oxidation catalyst for treating an exhaust gas from a compression ignition engine in combination with either a diesel particulate filter or a catalysed soot filter (CSF), and a selective catalytic reduction (SCR) catalyst, preferably wherein the oxidation catalyst is, or is for use as, a diesel oxidation catalyst. The oxidation catalyst is typically followed by (e.g. is upstream of) the diesel particulate filter or the catalysed soot filter (CSF). The DPF or CSF is typically followed by (e.g. is upstream of) the selective catalytic reduction (SCR) catalyst. A nitrogenous reductant injector may be arranged between the DPF or CSF and the selective catalytic reduction (SCR) catalyst. Thus, the DPF or CSF may be followed by (e.g. is upstream of) a nitrogenous reductant injector, and the nitrogenous reductant injector may be followed by (e.g. is upstream of) the selective catalytic reduction (SCR) catalyst.

A sixth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. A further aspect of this embodiment relates to the use of the oxidation catalyst for treating an exhaust gas from a compression ignition engine in combination with a diesel oxidation catalyst (DOC) and a selective catalytic reduction (SCR) catalyst, preferably wherein the oxidation catalyst is, or is for use as, a catalysed soot filter (CSF). The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a seventh exhaust system embodiment, the exhaust system comprises the oxidation catalyst of the invention, preferably as a PNA and/or a DOC, a selective catalytic reduction (SCR) catalyst and either a catalysed soot filter (CSF) or a diesel particulate filter (DPF). This embodiment also relates to the use of the oxidation catalyst for treating an exhaust gas from a compression ignition engine in combination with a selective catalytic reduction (SCR) catalyst and either a catalysed soot filter (CSF) or a diesel particulate filter (DPF), preferably wherein the oxidation catalyst is, or is for use as, a diesel oxidation catalyst.

In the seventh exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

In any of the first, second or fifth to seventh exhaust system embodiments described hereinabove containing a SCR catalyst (including SCRF™ catalyst), an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

Generally, it is preferred that the exhaust system of the invention does not comprise a lean $NO_x$ trap (LNT) (sometimes referred to as a lean $NO_x$ trap catalyst, a $NO_x$ adsorber catalyst (NAC), a De $NO_x$ trap (DNT) catalyst, a $NO_x$ storage catalyst, or a $NO_x$ storage/reduction (NSR) catalyst).

The invention further provides a vehicle comprising a compression ignition engine and either an exhaust system of the invention or an oxidation catalyst of the invention. Generally, the compression ignition engine is a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The invention also relates to several methods and uses involving the oxidation catalyst. A general aim of all of the methods or uses of the invention is treat an exhaust gas from a compression ignition engine without producing a substantial amount of nitrous oxide ($N_2O$), whether the exhaust gas is treated by (i) treating (e.g. oxidising) carbon monoxide (CO) and hydrocarbons (HCs) in the exhaust gas, (ii) modulating the content of $NO_x$ in the exhaust gas, and/or (iii) using the oxidation catalyst as a passive $NO_x$ absorber (PNA).

The term "substantial amount of nitrous oxide ($N_2O$)" in this context, at least for light duty vehicles, refers to >0.030 g/mile of $N_2O$ as measured using the Federal Test Procedure 75 (FTP-75), preferably ≥0.025 g/mile, more preferably ≥0.020 g/mile, such as >0.015 g/mile, and even more preferably 0.010 g/mile (e.g. >0.005 g/mile. Any reference to "without producing a substantial amount of nitrous oxide" in the context of a treated exhaust gas or to "a treated exhaust gas that does not contain a substantial amount of nitrous oxide" may refer to the exhaust gas that is passed into the atmosphere (i.e. as the exhaust gas that has passed through an exhaust system, such as measured at the outlet of a vehicle exhaust pipe) or to the exhaust gas directly obtained from the outlet of the oxidation catalyst (i.e. when there are downstream emissions control devices that may generate $N_2O$).

In general, the method aspects of the invention may include a step of producing a treated exhaust gas that does not contain a substantial amount of nitrous oxide ($N_2O$). This step typically follows the step of contacting the exhaust gas with the oxidation catalyst. This step typically also precedes any step of passing the treated exhaust gas to an emissions control device. Similarly, the oxidation catalyst of the invention can be used to produce a treated exhaust gas that does not contain a substantial amount of nitrous oxide ($N_2O$).

In the methods and uses of the invention, typically the composition of the exhaust gas contacted with the oxidation catalyst is not altered (e.g. by changing or cycling the mode of operation of the compression ignition engine to substantially alter the air to fuel ratio (i.e. from lean to rich or vice-versa)) to facilitate storage of $NO_x$ from the exhaust gas or to release $NO_x$ from the oxidation catalyst.

The methods or uses of the invention may also include a step of removing sulphur stored in the oxidation catalyst. Typically, sulphur can be removed under lean conditions at an appreciable rate for practical use in automotive aftertreatment systems when the oxidation catalyst has a temperature greater than 550° C. The oxidation catalyst may reach this temperature via transfer of heat from the exhaust gas. It may, however, be necessary to heat the oxidation catalyst to a temperature greater than 700° C., for example to 780° C. or more, to remove stored sulphur.

Generally, the oxidation catalyst may be used in combination with an emissions control device. Typically, the oxidation catalyst is used in combination with:

(i) a selective catalytic reduction (SCR) catalyst, preferably a SCR catalyst downstream of the oxidation catalyst, particularly when the oxidation catalyst is or is used as a diesel oxidation catalyst (DOC);

(ii) a selective catalytic reduction filter (SCRF™) catalyst, preferably a SCRF™ catalyst downstream of the oxidation catalyst, particularly when the oxidation catalyst is or is used as a diesel oxidation catalyst (DOC);

(iii) a diesel particulate filter (DPF) or a catalysed soot filter (CSF), preferably a DPF or CSF downstream of the oxidation catalyst, particularly when the oxidation catalyst is or is used as a diesel oxidation catalyst (DOC);

(iv) a diesel oxidation catalyst (DOC), preferably a DOC upstream of the oxidation catalyst of the invention, particularly when the oxidation catalyst is or is used as a catalysed soot filter (CSF);

(v) a diesel particulate filter (DPF) or a catalysed soot filter (CSF) and a selective catalytic reduction (SCR) catalyst, preferably a DPF or CSF downstream of the oxidation catalyst and an SCR catalyst downstream of the DPF or CSF, particularly when the oxidation catalyst is or is used as a diesel oxidation catalyst (DOC);

(vi) a diesel oxidation catalyst (DOC) and a selective catalytic reduction (SCR) catalyst, preferably a DOC upstream of the oxidation catalyst of the invention and a SCR catalyst downstream of the oxidation catalyst of the invention, particularly when the oxidation catalyst is or is used as a catalysed soot filter (CSF); or (vii) a selective catalytic reduction (SCR) catalyst and either a diesel particulate filter (DPF) or a catalysed soot filter (CSF), preferably a SCR catalyst downstream of the oxidation catalyst and a DPF or CSF downstream of the SCR catalyst, particularly when the oxidation catalyst is or is used as a diesel oxidation catalyst (DOC).

When the oxidation catalyst is used as a passive $NO_x$ absorber (PNA), the oxidation catalyst absorbs or stores $NO_x$ from the exhaust gas at a first temperature range and releases $NO_x$ at a second temperature range, wherein the second temperature range is higher the first temperature range (e.g. the midpoint of the second temperature range is higher than the midpoint of the first temperature range). It is preferable that the second temperature range does not overlap with the first temperature range. There may be a gap between the upper limit of first temperature range and the lower limit of the second temperature range.

Typically, the oxidation catalyst releases $NO_x$ at a temperature greater than 200° C. This is the lower limit of the second temperature range. Preferably, the oxidation catalyst releases $NO_x$ at a temperature of 220° C. or above, such as 230° C. or above, 240° C. or above, 250° C. or above, or 260° C. or above.

The oxidation catalyst absorbs or stores $NO_x$ at a temperature of 200° C. or less. This is the upper limit of the first temperature range. Preferably, the oxidation catalyst absorbs or stores $NO_x$ at a temperature of 195° C. or less, such as 190° C. or less, 185° C. or less, 180° C. or less, or 175° C. or less.

The oxidation catalyst may preferentially absorb or store nitric oxide (NO). Thus, any reference to absorbing, storing or releasing $NO_x$ in this context may refer absorbing, storing or releasing nitric oxide (NO). Preferential absorption or storage of NO will decrease the ratio of $NO:NO_2$ in the exhaust gas.

In addition or as an alternative to using the oxidation catalyst as a passive $NO_x$ absorber (PNA), the oxidation catalyst can be used to modulate the content of $NO_x$ in an exhaust gas from a compression ignition engine, such as for a downstream emissions control device.

Any reference to "modulate the $NO_x$ content" as used herein, particularly in relation to method or use aspects of the invention, refers to changing (i.e. adjusting) or maintaining the ratio (in ppm or % volume, typically at the temperature and pressure of the exhaust gas) of $NO:NO_2$ to be within a predefined range at a specific exhaust gas temperature or temperature range.

In general, "modulate the $NO_x$ content" refers to changing or maintaining, preferably changing, the ratio (in ppm or % volume) of $NO:NO_2$ in an exhaust gas, typically directly from the compression ignition engine, to be less than 17:3 (i.e. the amount of NO to $NO_2$ is less than that which is normally found in an exhaust gas from a compression ignition engine), preferably the ratio of $NO:NO_2$ is from 5:1 to 1:5, more preferably 2.5:1 to 1:2.5, and even more preferably 2:1 to 1:2 (e.g. 1.5:1 to 1:1.5 or about 1:1). The ratio of $NO:NO_2$ when the temperature is at the first temperature range (i.e. the temperature at which $NO_x$ is stored or absorbed) may be lower than the ratio at the second temperature range (i.e. the temperature at which $NO_x$ is released).

In the second method aspect of the invention, the step of "(a) controlling the $NO_x$ content of an exhaust gas by contacting the exhaust gas with an oxidation catalyst . . . " may further include the steps of (i) absorbing or storing $NO_x$ from the exhaust gas at a first temperature range, and (ii) releasing $NO_x$ at a second temperature range, thereby producing a treated exhaust gas. Preferably, the second temperature range is higher the first temperature range (e.g. the midpoint of the second temperature range is higher than the midpoint of the first temperature range). More preferably the second temperature range does not overlap with the first temperature range. There may be a gap between the upper limit of first temperature range and the lower limit of the second temperature range.

Typically, the second temperature range is a temperature greater than 200° C., preferably, a temperature of 220° C. or above, such as 230° C. or above, 240° C. or above, 250° C. or above, or 260° C. or above.

The first temperature range is typically a temperature of 200° C. or less, preferably a temperature of 195° C. or less, such as 190° C. or less, 185° C. or less, 180° C. or less, or 175° C. or less.

Generally, the step of (b) passing the treated exhaust gas to an emissions control device typically involves directly passing the treated exhaust gas to the emissions control device. Thus, an outlet of the oxidation catalyst is directly connected (e.g. without intermediary) to an inlet of the emissions control device.

The emissions control device is typically a selective catalytic reduction (SCR) catalyst, a selective catalytic reduction filter (SCRF™) catalyst, a diesel particulate filter (DPF), or a catalysed soot filter (CSF).

In the second method aspect of the invention, the references to "$NO_x$ content", "absorbing or storing NO" or "releasing $NO_x$" may refer to nitric oxide (NO), such as when the oxidation catalyst preferentially stores NO.

In the fourth use aspect of the invention, the oxidation catalyst is used in the regeneration of an emissions control device having a filtering substrate. Typically, the emissions control device having a filtering substrate is downstream of the oxidation catalyst.

The emissions control device having a filtering substrate may be selected from the group consisting of a diesel particulate filter (DPF), a catalysed soot filter (CSF), a selective catalytic reduction filter (SCRF™) catalyst and a combination of two or more thereof.

The oxidation catalyst may be used to regenerate the emissions control device having a filtering substrate by oxidising nitric oxide (NO) to nitrogen dioxide ($NO_2$) at a temperature of at least 220° C., preferably at least 240° C., more preferably at least 260° C., still more preferably at least 280° C.

Definitions

The term "washcoat" is well known in the art and refers to an adherent coating that is applied to a substrate usually during production of a catalyst. The coating or washcoat generally comprises one or more components of a catalyst formulation, which components are typically selected from a platinum group metal, a support material, an oxygen storage component and a hydrocarbon adsorbent.

The term "washcoat region" as used herein refers to an area of washcoat on a substrate. A "washcoat region" can, for example, be disposed or supported on a substrate as a "layer" or a "zone". The area or arrangement of a washcoat on a substrate is generally controlled during the process of applying the washcoat to the substrate. The "washcoat region" typically has distinct boundaries or edges (i.e. it is possible to distinguish one washcoat region from another washcoat region using conventional analytical techniques).

It is preferable that each "washcoat region" has a substantially uniform composition (i.e. there is no substantial difference in the composition of the washcoat when comparing one part of the washcoat region with another part of that washcoat region). Substantially uniform composition in this context refers to a material (e.g. washcoat region) where the difference in composition when comparing one part of the washcoat region with another part of the washcoat region is 5% or less, usually 2.5% or less, and most commonly 1% or less.

The term "washcoat zone" as used herein refers to a washcoat region of substantially uniform length. The length of a washcoat zone may be the same as the total length of the substrate. In general, the length of a washcoat zone is less than the total length of the substrate. The total length of a substrate is the distance between its inlet end and its outlet end (e.g. the opposing ends of the substrate). A "washcoat zone" typically has a length (i.e. a substantially uniform length) of at least 5% of the total length of the substrate.

Any reference to a "substantially uniform" in the context of a length or to "substantially uniform length" as used herein refers to a length that does not deviate by more than 10%, preferably does not deviate by more than 5%, more preferably does not deviate by more than 1%, from its mean value.

Any reference to a "washcoat zone disposed at an inlet end of the substrate" used herein refers to a washcoat zone disposed or supported on a substrate that is nearer to an inlet end of the substrate than it is to an outlet end of the substrate. Thus, the midpoint of the washcoat zone (i.e. at half its length) is nearer to the inlet end of the substrate than the midpoint is to the outlet end of the substrate. Similarly, any reference to a "washcoat zone disposed at an outlet end of the substrate" used herein refers to a washcoat zone disposed or supported on a substrate that is nearer to an outlet end of the substrate than it is to an inlet end of the substrate. Thus, the midpoint washcoat zone (i.e. at half its length) is nearer to the outlet end of the substrate than the midpoint is to the inlet end of the substrate.

When the substrate is a wall-flow filter, then generally any reference to a "washcoat zone disposed at an inlet end of the substrate" refers to a washcoat zone disposed or supported on the substrate that is (a) nearer to an inlet end of an inlet channel of the substrate than it is to a closed end of the inlet channel, and/or (b) nearer to a closed end of an outlet channel of the substrate than it is to an outlet end of the outlet channel. Thus, the midpoint of the washcoat zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel. Similarly, any reference to a "washcoat zone disposed at an outlet end of the substrate" when the substrate is a wall-flow filter refers to a washcoat zone disposed or supported on the substrate that is (a) nearer to an outlet end of an outlet channel of the substrate than it is to a closed end of the outlet channel, and/or (b) nearer to a closed end of an inlet channel of the substrate than it is to an inlet end of the inlet channel. Thus, the midpoint of the washcoat zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

Any reference to "absorbing $NO_x$" from an exhaust gas as used herein refers to the removal of $NO_x$ from the exhaust gas by storing it in the oxidation catalyst. The storage may be a process of adsorption, but the oxidation catalyst is not limited to storing $NO_x$ in this specific way.

The term "mixed oxide" as used herein generally refers to a mixture of oxides in a single phase, as is conventionally known in the art.

The term "composite oxide" as used herein generally refers to a composition of oxides having more than one phase, as is conventionally known in the art.

Any reference to a temperature or temperature range, such as the "first temperature range" or the "second temperature range" as used herein generally refers to the temperature of the exhaust gas, preferably the temperature of the exhaust gas at an inlet of the oxidation catalyst.

Any reference herein to an amount in units of g $ft^{-3}$ (grams per cubic foot) or g $in^{-3}$ (grams per cubic inch) refer to the mean weight of a component per volume of the substrate and typically includes the volume of the void spaces of the substrate.

The expression "consisting essentially" as used herein limits the scope of a feature to include the specified materials or steps, and any other materials or steps that do not materially affect the basic characteristics of that feature, such as for example minor impurities. For the avoidance of doubt, the expression "consisting essentially of" embraces the expression "consisting of".

In the context of platinum (Pt) or palladium (Pd), it is to be appreciated that it is often difficult to characterise the exact catalytic species in a catalyst and the platinum or palladium may not be present in elemental, metallic form. Any reference to "consisting essentially of platinum . . . " embraces a "platinum component" where the platinum moiety can be an elemental form of platinum, an alloy containing platinum or a compound comprising platinum (e.g. an oxide of platinum), preferably an elemental form of platinum or an alloy containing platinum, more preferably an elemental form of platinum. Similarly, any reference to "consisting essentially of palladium . . . " embraces a "palladium component" where the palladium moiety can be an elemental form of palladium, an alloy containing palladium or a compound comprising palladium (e.g. an oxide of palladium), preferably an elemental form of palladium or an alloy containing palladium, more preferably an elemental form of palladium.

The term "substantially free" as used herein in the context of a particular chemical entity refers to a composition or material that contains less than 0.5% by weight of the chemical entity, typically less than 0.1% by weight of the chemical entity, such as less than 0.01% by weight of the chemical entity. Generally, the chemical entity is not detectable using conventional analytical techniques.

EXAMPLES

The invention will now be illustrated by the following non-limiting examples.

Example 1

Palladium nitrate was added to a slurry of ceria in water. The slurry containing palladium nitrate was stirred to homogenise then coated onto a metallic substrate with 300 cells per square inch using conventional coating techniques to form a first layer. The coated part was dried and calcined at 500° C.

A second slurry was prepared by taking alumina powder and milling to a particle size where the $d_{90}$ was less than 20 micron. Soluble platinum and palladium salts were added and the resulting slurry was stirred to homogenise. This second slurry was coated on to the part using conventional coating techniques to form a second layer. The part was dried and calcined at 500° C.

The resulting catalyst had a total loading of platinum and palladium (i.e. the total PGM loading in both layers) of 160 g/ft$^3$ and the total mass ratio (i.e. both layers) of Pt:Pd was 5:11.

Example 2

An alumina slurry was prepared using an alumina powder that had been milled to a particle size where the $d_{90}$ was less than 20 micron. Soluble platinum and palladium salts were added and the resulting slurry was stirred to homogenise. This slurry was then coated on to a metallic substrate with 300 cells per square inch using conventional coating techniques to form a first layer. The part was dried and calcined at 500° C.

Palladium nitrate was added to a slurry of ceria in water. This second slurry containing palladium nitrate was stirred to homogenise and was then coated onto the part using conventional coating techniques to form a second layer. The coated part was dried and calcined at 500° C.

The resulting catalyst had a total loading of platinum and palladium (i.e. the total PGM loading in both layers) of 160 g/ft$^3$ and the total mass ratio (i.e. both layers) of Pt:Pd was 5:11.

Experimental Results

The catalysts of Examples 1 and 2 were hydrothermally aged at 800° C. for 16 hours. Each catalyst was installed on a bench mounted engine and tested for (a) its CO light off using a temperature ramp and (b) its $N_2O$ emissions over a simulated MVEG-B drive cycle. Emissions measurements were continuously recorded both upstream and downstream of each catalyst.

The CO light off results are reported as a $T_{80}$, which is the temperature at which 80% of the CO emission from the engine has been converted to $CO_2$. The results are shown in Table 1 below.

TABLE 1

| Example No. | $T_{80}$ (° C.) |
| --- | --- |
| 1 | 120 |
| 2 | 96 |

The amount of $N_2O$ in the exhaust emission from each catalyst after running the engine over the MVEG cycle is shown in FIG. 1. The $N_2O$ emission when the catalyst of Example 2 was used (see the full line in FIG. 1) was lower than that from Example 1 (see the dashed line in FIG. 1).

Examples 3 to 5

Palladium nitrate was added to a slurry of ceria in water. The slurry containing the palladium nitrate was stirred to homogenise and then coated onto a ceramic substrate using conventional coating techniques. The coated part was dried and calcined at 500° C. The loading of ceria was 2.7 g in$^{-3}$ (Examples 3 to 5). The loading of palladium as a percentage of the loading of ceria was varied as follows: 1 wt % (Example 3); 2 wt % (Example 4); 4 wt % (Example 5). Each of the coated parts was hydrothermally aged at 750° C. for 15 hours.

Experimental Results

A 1×3" core sample from each of the catalysts of Examples 3, 4 and 5 was taken and tested on a synthetic gas rig. The gas mix that was used to perform the tests is shown in Table 2 below.

TABLE 2

| Gas | Amount |
| --- | --- |
| NO | 100 ppm |
| CO | 500 ppm |
| $CO_2$ | 4.5% |
| $H_2O$ | 5% |
| $O_2$ | 12% |
| $N_2$ | Balance |

Each of the core samples was brought up to 80° C. and then exposed to the gas mix in Table 2 for 10 minutes with the aim of storing $NO_x$. The gas mix was then switched to nitrogen and each core sample was heated to 600° C. with the aim of thermally releasing any stored $NO_x$.

The above procedure was repeated except that each core sample was brought up to 120° C., 160° C. and 200° C. before being exposed to the gas mix in Table 2. The amount of $NO_x$ stored over each 10 minute period was measured and the results are shown in FIG. 2.

Figure 2:
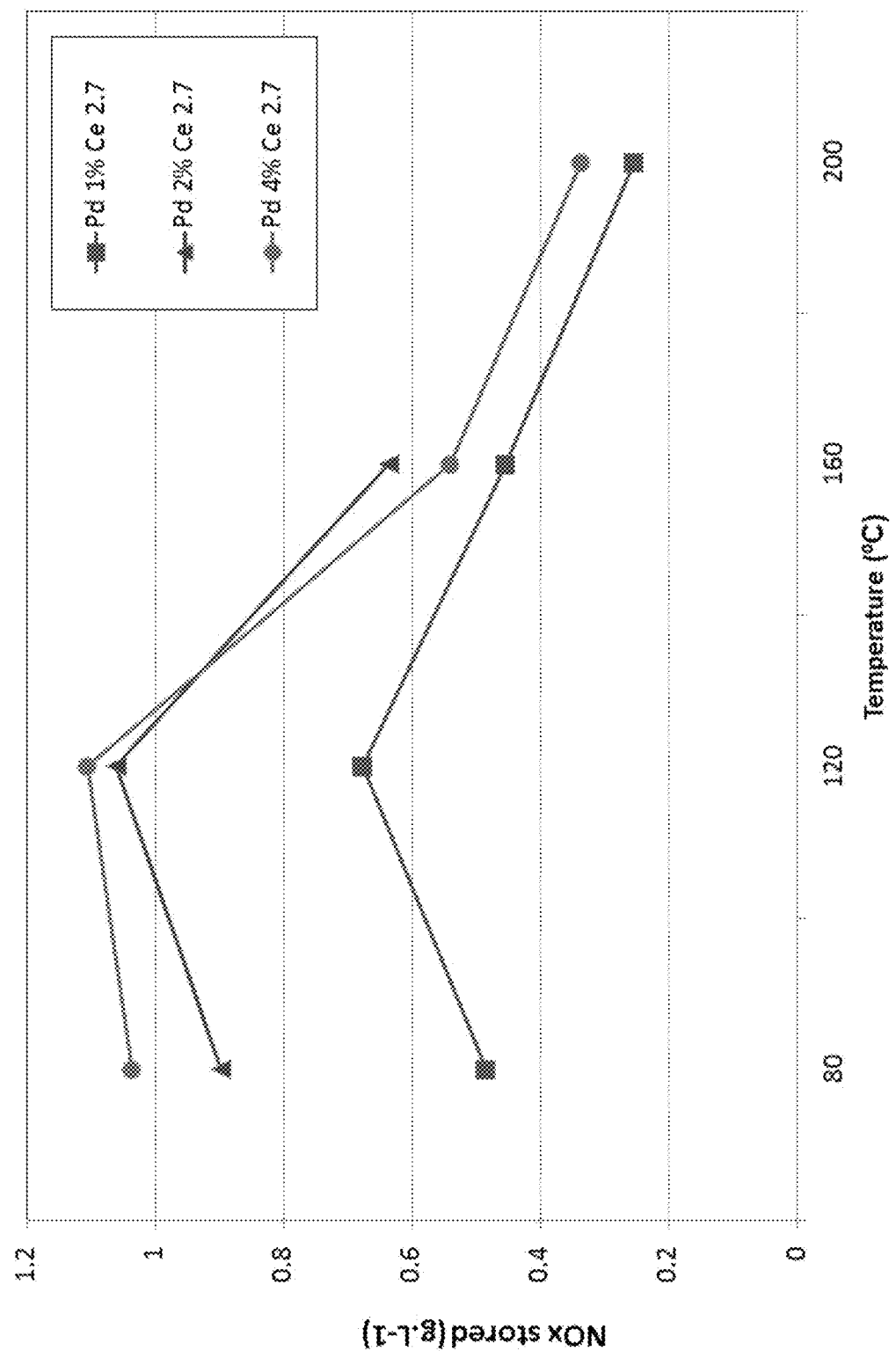
FIG. 2 is a graph showing the effect of palladium loading on the amount of $NO_x$ stored in g $L^{-1}$ (y-axis) at various temperatures in ° C. (x-axis). Palladium was supported in an amount of 1 wt % (■), 2 wt % (▲) or 4 wt % (●) on ceria, which was loaded in an amount of 2.7 g $in^{-3}$ onto a substrate.

FIG. 2 shows that increasing the loading of Pd from 1 wt % (■) to 2 wt % (▲) increases the amount of $NO_x$ that is stored. A further increase in the Pd loading from 2 wt % (▲) to 4 wt % (●) provided a relatively small increase in $NO_x$ storage.

Examples 6 to 8

Palladium nitrate was added to a slurry of ceria in water. The slurry containing palladium nitrate was stirred to homogenise and then coated onto a ceramic substrate using conventional coating techniques. The coated part was dried and calcined at 500° C. The loading of palladium was 46.7 g ft$^{-3}$ (Examples 6 to 8). The loading of ceria was varied as follows: 1.35 g in$^{-3}$ (Example 6); 0.9 g in$^{-3}$ (Example 7); 0.675 g in$^{-3}$ (Example 8). The loading of palladium as a percentage of the loading of ceria is as follows: 2 wt % (Example 6); 3 wt % (Example 7); 4 wt % (Example 8). Each of the coated parts was hydrothermally aged at 750° C. for 15 hours.

Experimental Results

Figure 3:
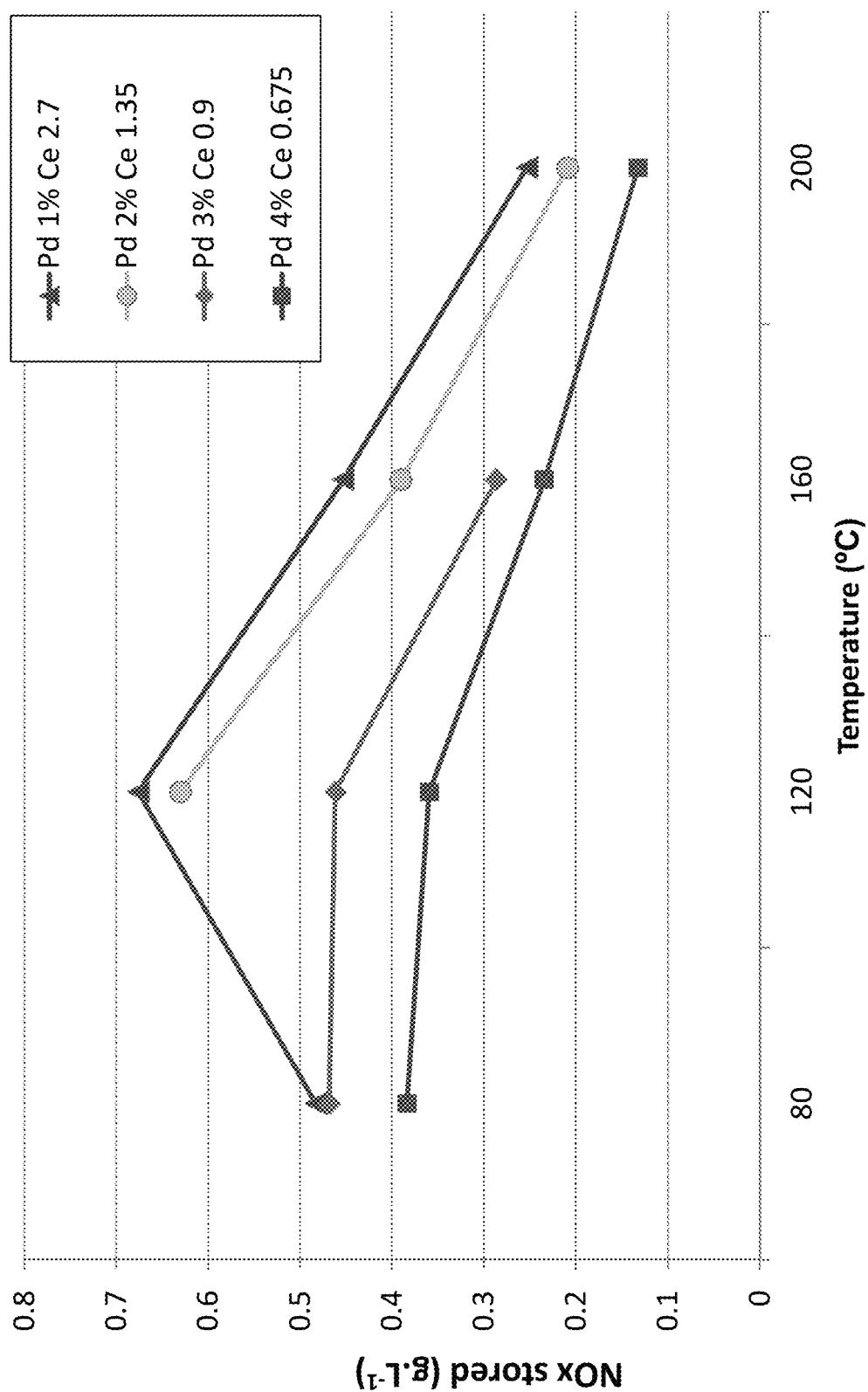
FIG. 3 is a graph showing the effect of varying both the palladium and cerium loading on the amount of $NO_x$ stored in $gL^{-1}$ (y-axis) at various temperatures in ° C. (x-axis). Palladium and cerium were loaded in amounts of 1 wt % Pd and 2.7 g $in^{-3}$ ceria (▲); 2 wt % Pd and 1.35 g $in^{-3}$ ceria (●); 3 wt % Pd and 0.9 g $in^{-3}$ ceria (♦); and 4 wt % Pd and 0.675 g $in^{-3}$ ceria (■).

A 1×3" core sample from each of the catalysts of Examples 3, 6, 7 and 8 was taken and tested on a synthetic gas rig. The method and gas mix used to test Examples 3 and 6 to 8 was the same as that used for Examples 3 to 5 above. The results are shown in FIG. 3.

FIG. 4 shows that for a fixed Pd loading of 46.7 g ft$^{-3}$ the amount of stored $NO_x$ storage increases with the loading of ceria. However, this trend is not linear and smaller increases in the amount of stored $NO_x$ storage were observed when the loading of ceria was increased from 1.35 g in$^{-3}$ (●) to 2.7 g in$^{-3}$ (▲).

For the avoidance of any doubt, the entire content of any and all documents cited herein is incorporated by reference into the present application.

The invention claimed is:

1. An oxidation catalyst for treating an exhaust gas from a compression ignition engine, which oxidation catalyst comprises:
   a flow-through substrate monolith having an inlet end and an outlet end;
   a first washcoat region free of platinum comprising palladium (Pd) and a first support material comprising cerium oxide; and
   a second washcoat region comprising platinum (Pt) and a second support material,
   wherein the second washcoat region is arranged to contact inlet exhaust gas before the first washcoat region, wherein:
   the second washcoat region is a second washcoat zone disposed or supported at the inlet end of the flow-through substrate monolith and the first washcoat region is disposed or supported downstream from the second washcoat zone.

2. The oxidation catalyst according to claim 1, wherein the second washcoat region further comprises palladium (Pd).

3. The oxidation catalyst according to claim 2, wherein the mass of platinum (Pt) is greater than the mass of palladium (Pd) in the second washcoat region.

4. The oxidation catalyst according to claim 2, wherein the ratio by mass of platinum to palladium in the second washcoat region is 20:1 to 1.1:1.

5. The oxidation catalyst of claim 1, wherein the second support material comprises a refractory metal oxide.

6. The oxidation catalyst according to claim 5, wherein the refractory metal oxide is selected from the group consisting of alumina, silica, titania, zirconia, ceria and mixed or composite oxides of two or more thereof.

7. The oxidation catalyst according to claim 6, wherein the refractory metal oxide is alumina.

8. The oxidation catalyst of claim 1, wherein the first washcoat region comprises an amount of palladium (Pd) of 0.25 to 1.9% by weight.

9. The oxidation catalyst according to claim 1, wherein the first washcoat region comprises an amount of palladium (Pd) of 0.2% to 15% by weight.

10. The oxidation catalyst according to claim 9, wherein the first washcoat region comprises palladium (Pd) in an amount of 5 to 300 g ft$^{-3}$.

11. The oxidation catalyst according to claim 10, wherein the second washcoat region comprises platinum (Pt) in an amount of 5 to 300 g ft$^{-3}$.

12. The oxidation catalyst according to claim 1, wherein a total amount of first support material and second support material is 0.2 to 8 g in$^{-3}$.

13. An exhaust system comprising an oxidation catalyst of claim 1, and an emissions control device disposed downstream from the outlet of the oxidation catalyst, wherein the emissions control device is a selective catalytic reduction (SCR) catalyst, a selective catalytic reduction filter (SCRF™) catalyst, a diesel particulate filter (DPF), or a catalysed soot filter (CSF).

14. A vehicle comprising a compression ignition engine and either:
   (a) an oxidation catalyst of claim 1; or
   (b) an exhaust system according to claim 13.

15. A method of modulating the content of $NO_x$ in an exhaust gas from a compression ignition engine for an emissions control device, which method comprises:
   (a) controlling the $NO_x$ content of an exhaust gas by contacting the exhaust gas with an oxidation catalyst according to claim 1 to produce a treated exhaust gas; and
   (b) passing the treated exhaust gas to an emissions control device, which is a selective catalytic reduction (SCR) catalyst, a selective catalytic reduction filter (SCRF™) catalyst, a diesel particulate filter (DPF), or a catalysed soot filter (CSF).

* * * * *